(12) United States Patent
Yamagata et al.

(10) Patent No.: US 8,131,896 B2
(45) Date of Patent: Mar. 6, 2012

(54) SIGNAL CONVERTER, SIGNAL PROCESSOR AND SIGNAL CONVERSION TRANSMISSION SYSTEM

(75) Inventors: Masaoki Yamagata, Kawasaki (JP); Shohei Udo, Miyazaki (JP); Shiro Igasaki, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 139 days.

(21) Appl. No.: 12/801,241

(22) Filed: May 28, 2010

(65) Prior Publication Data

US 2010/0312930 A1 Dec. 9, 2010

(30) Foreign Application Priority Data

Jun. 5, 2009 (JP) .................................. 2009-135774
Mar. 5, 2010 (JP) .................................. 2010-049815

(51) Int. Cl.
*G06F 13/12* (2006.01)
*G06F 13/14* (2006.01)
*G06F 13/42* (2006.01)
(52) U.S. Cl. ............................. 710/62; 710/14; 710/105
(58) Field of Classification Search .................. None
See application file for complete search history.

(56) References Cited

U.S. PATENT DOCUMENTS

2007/0210916 A1*  9/2007  Ogushi et al. ................ 340/531
2009/0276117 A1* 11/2009  Raichle et al. ................ 701/33

FOREIGN PATENT DOCUMENTS

| JP | A-60-177210 | 9/1985 |
| JP | A-61-11885 | 1/1986 |
| JP | A-64-76375 | 3/1989 |
| JP | 403253939 A * | 11/1991 |
| JP | A-468825 | 3/1992 |
| JP | A-7-231227 | 8/1995 |
| JP | B2-2734368 | 1/1998 |

\* cited by examiner

*Primary Examiner* — Ilwoo Park
(74) *Attorney, Agent, or Firm* — Oliff & Berridge, PLC

(57) ABSTRACT

An input tool has: an I/O unit having a digimatic interface; a first signal conversion unit that converts a measurement signal in a signal format according to an HID keyboard protocol capable of being processed by an HID driver; a second signal conversion unit that converts the measurement signal into a signal format according to a virtual serial port protocol capable of being processed by a VCP driver; a conversion controller that makes one of the first signal conversion unit and the second signal conversion unit to convert a signal format of the measurement signal; and a USB communicator having a USB interface that is connectable with a PC, the USB communicator outputting the measurement signal.

10 Claims, 17 Drawing Sheets

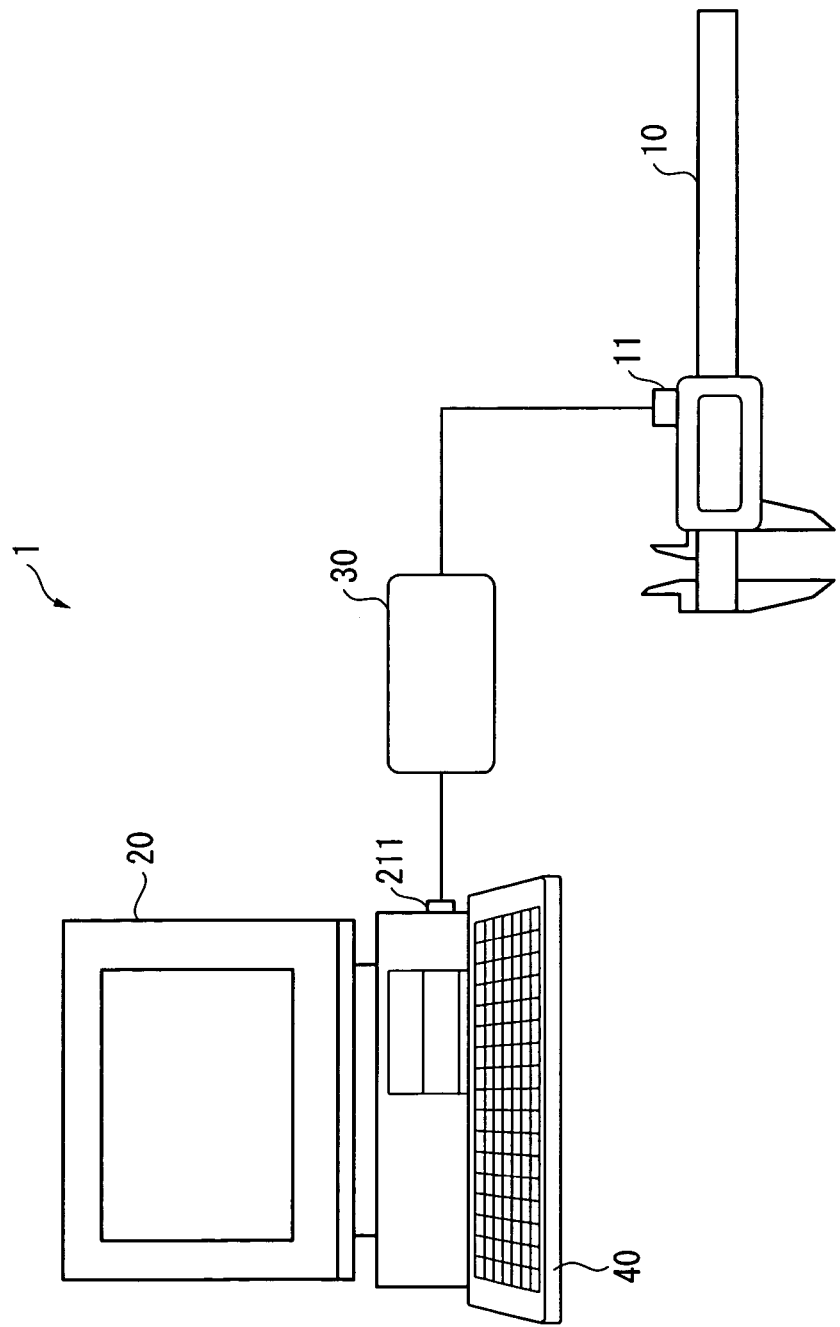

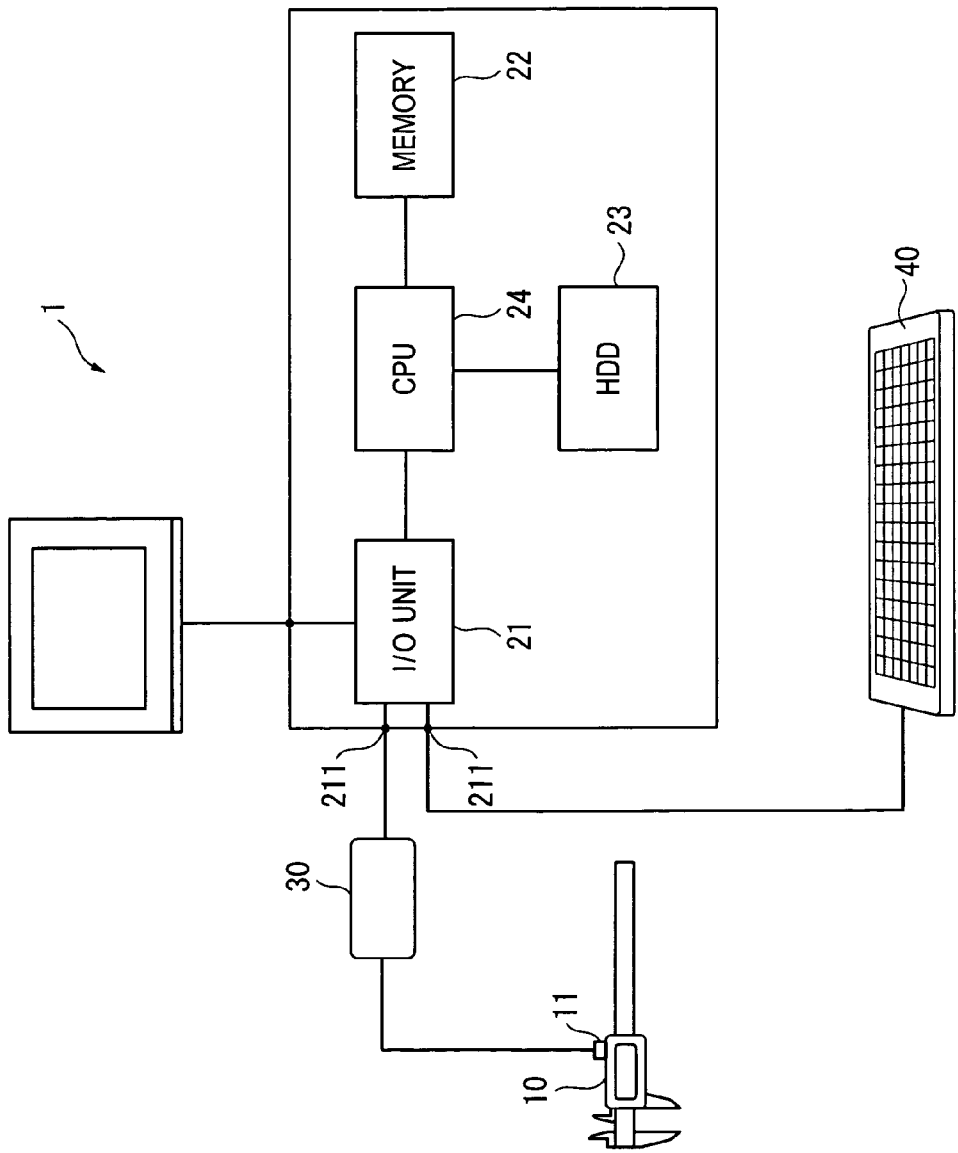

| SIGNAL NAME | I/O | SIGNAL CONTENT |
|---|---|---|
| GND | - | SIGNAL GROUND |
| DATA | I | DATA |
| CK | I | SYNCHRONIZATION CLOCK FOR DATA-INPUT |
| #RDY | I | DATA TRANSMISSION REQUEST FROM GAUGE (DATA BUTTON) |
| #REQ | O | DATA OUTPUT REQUEST TO GAUGE |

FIG.17

| DATA | CK | SWITCHED PROTOCOL |
|---|---|---|
| L | L | USBTMC |
| L | H | HID |
| H | L | CDC |
| H | H | ERROR (EQUIVALENT TO DISCONNECTED) |

SIGNAL CONVERTER, SIGNAL PROCESSOR AND SIGNAL CONVERSION TRANSMISSION SYSTEM

The entire disclosure of Japanese Patent Application No. 2009-135774, filed Jun. 5, 2009, and No. 2010-049815, filed Mar. 5, 2010, is expressly incorporated by reference herein.

BACKGROUND OF THE INVENTION

1. Field of the Invention

The present invention relates to a signal converter that outputs a measurement signal after converting a signal format of the measurement signal outputted by a measuring instrument into a predetermined signal format, a signal processor that is connectable with the signal converter and a signal conversion transmission system.

2. Description of Related Art

Traditionally, an apparatus (input tool) has been used for inputting a measurement signal outputted by a measuring instrument into an information processor such as a personal computer (see, for instance, Document 1: JP-A-60-177210).

The apparatus disclosed in Document 1 includes a signal transmission cable that connects a caliper gauge (measuring instrument) and a data processor to transmit the measurements by the measuring instrument to a data processor.

The measurement signal outputted by the measuring instrument is inputted/outputted via a unique serial port interface (I/F). Accordingly, when the measurement signal is inputted into, for instance, an information processor such as a personal computer (PC), the measurement signal has to be converted into a format suitable for the interface provided on the personal computer with the use of the above input tool.

Such an input tool converts the signal format of the measurement signal according to an HID (Human Interface Device Profile) keyboard protocol and transmits the converted measurement signal to a personal computer via a USB (Universal Serial Bus) connection. The input tool converts the measurement signal into a signal format specified for the HID keyboard protocol with an installed firmware for the HID keyboard protocol or with a hardware configuration according to the HID keyboard protocol. Then, the input tool outputs the measurement signal to a signal processor such as a personal computer via a USB connection interface (referred to as USB interface hereinafter).

On the other hand, many of recent personal computers have an HID driver that is capable of processing a signal of a format according to the HID keyboard protocol as a default in a device driver provided by an OS (Operating System). Accordingly, when the measurement signal converted according to the HID keyboard protocol is inputted to such a personal computer by the input tool connected via the USB interface, the inputted signal can be processed in the same manner as the data inputted via an HID keyboard connected through the USB interface.

However, some of application software (S/W) require input of a signal in a format according to, for instance, serial port protocol. Further, some of the application software require the use of different software interfaces (API: Application Program Interface) for the measurement signal. When the input tool only outputs a measurement signal in a format according to the HID keyboard protocol through the USB interface for such application software, the signal inputted to a personal computer may not accord with the API and thus may not be processable. Though an RS-232C connection input tool that is connectable via a serial port may be separately provided considering compatibility with the above API, separate provision of such input tools necessitates a production of a plurality of types of input tools, which increases the production cost.

Alternatively, a convertor chip for converting the USB interface into RS-232C interface may be provided. However, since it is necessary to separately provide such a convertor chip, the hardware configuration becomes complicated and the production cost increases.

SUMMARY OF THE INVENTION

An object of the invention is to provide a signal converter, a signal processor and a signal conversion transmission system with a low cost and a wide applicability.

A signal converter according to an aspect of the invention connects a measuring instrument for conducting a predetermined measurement and outputting a measurement signal obtained by the measurement with a signal processor for processing the measurement signal and transmits to the signal processor a signal outputted by a first communication interface provided on the measuring instrument after converting the signal in a signal transmission format capable of being inputted to a second communication interface provided on the signal processor, the signal converter including: a first communication unit that has the first communication interface; a first signal conversion unit that converts the measurement signal in a signal format according to a first communication protocol that is processable by a first driver installed in the signal processor; a second signal conversion unit that converts the measurement signal in a signal format according to a second communication protocol that is processable by a second driver installed in the signal processor; a conversion controller that selects one of the first signal conversion unit and the second signal conversion unit, selected one of the first and the second signal conversion units performing the conversion of the measurement signal; and a second communication unit that has a second communication interface that is capable of being connected with the signal processor, the second communication unit outputting the measurement signal.

In the above aspect of the invention, the signal converter has the first communication unit provided with the first communication interface and the second communication unit provided with the second communication interface. The first and the second communication units are respectively connected with the measuring instrument and the signal processor to connect the measuring instrument and the signal processor. The conversion controller of the signal converter converts the signal format of the measurement signal by the first or the second signal conversion units into one of the first and the second communication protocols. Then, the converted measurement signal is outputted to the signal processor.

Accordingly, even when different APIs are requested by the application software run on the signal processor, the signal converter can convert the signal format of the measurement signal in response to the request signal into a signal format corresponding to the API. Further, since it is not necessary to produce a separate conversion chip or manufacture a plurality of signal converters with different second communication interfaces, the production cost can be reduced.

In the signal converter according to the above aspect of the invention, the second communication interface is preferably a USB connection interface, the signal processor preferably has an HID driver that is capable of processing a signal according to an HID keyboard protocol inputted through the USB connection interface, and the first signal conversion unit preferably converts the measurement signal in a signal format according to the HID keyboard protocol.

According to the above arrangement, the signal converter and the signal processor are connected via the USB interface. The first signal conversion unit of the signal converter converts the signal format of the measurement signal into a signal format according to the HID keyboard protocol. The signal processor processes the measurement signal by the HID driver according to the HID keyboard protocol (USB•HID keyboard protocol) inputted through the USB interface.

The HID driver is a device driver for processing the input signal from a keyboard connected through the USB interface. When, for instance, a signal is inputted from a keyboard, the inputted signal of the keyboard is processed by the HID driver to be inputted to application software. Then, the application software is capable of processing according to the inputted signal. Such an HID driver is a driver software generally provided as default in an OS (e.g. Windows [trademark] distributed by Microsoft Corporation). When such an HID driver is not provided by an OS, the HID driver can be easily installed into the signal processor via various tools (e.g. the Internet).

When the measurement signal is converted into a signal format according to the HID keyboard protocol by the first signal conversion unit of the signal converter and is inputted to the signal processor through the USB interface, the signal processor processes the measurement signal by the HID driver. When the API of the application software supports the signal format according to the HID keyboard protocol, the measurement signal can be processed in the same operation as the input signal inputted by a keyboard without further conversion. In other words, without employing additional communication application software, the communication between the signal converter and the signal processor can be established using the HID driver installed as a default in the signal processor. Further, advanced programming technique is not required for the application software for processing the data from the measuring instrument but the processing can be achieved with a simple programming, thereby reducing the production cost of the application software.

The signal converter according to the above aspect of the invention preferably includes a virtual serial port driver that views the USB connection interface as a serial port interface and is capable of processing the signal inputted through the USB interface according to a serial port protocol, in which the second signal conversion unit converts the measurement signal in a signal format according to a virtual serial port protocol that is processable by the virtual serial port driver.

According to the above arrangement, the signal converter is provided with the virtual serial port driver such as a unique virtual COM port driver (Virtual COM Port (VCP) Driver: referred to as VCP driver hereinafter) and a CDC (Communication Device Class) driver. The virtual serial port driver is a device driver that simulates the serial port (COM port) by the USB interface to emulate, for instance, a serial port interface such as an RS-232C connection interface. The second signal conversion unit of the signal converter converts the signal format of the measurement signal inputted by the measuring instrument into a signal format corresponding to the virtual serial port protocol such as VCP protocol and CDC protocol that is processable by the virtual serial driver before outputting the measurement signal to the signal processor.

Accordingly, when the API of the application software run by the signal processor requests the serial port protocol as, for instance, a unique software interface of the measuring instrument, the signal converter can output the measurement signal converted by the second signal conversion unit of the signal converter to the signal processor. Thus, the application software of the signal processor is capable of processing the measurement signal inputted via the USB interface in the same manner as the measurement signal inputted via the serial port interface.

In other words, the signal converter can convert the signal format of the measurement signal into both the signal format according to the HID keyboard protocol and the signal format according to the serial port protocol, one of which is selected in accordance with the API of the application software, thus performing signal format conversion with a wide applicability. Further, since the signal conversion is performed solely by software, it is not necessary to produce a separate conversion chip or manufacture a plurality of signal converters with different second communication interfaces, so that the production cost can be reduced.

When a VCP driver is used as the virtual serial port driver, it is necessary to add a device driver to the signal processor for processing a measurement signal in accordance with the virtual serial port protocol inputted by the signal converter. In this case, when the OS is updated, a new device driver corresponding to the new OS sometimes has to be added. Thus, the operation of the device driver has to be checked each time the OS is updated and, when the device driver does not properly work, the device driver has to be revised or newly developed to meet the change in the OS, thereby increasing the complicated process and deteriorating the productivity. In addition, the signal processor also requires complicated process for, for instance, installing the new device driver.

In contrast, since the CDC driver is a driver soft that is installed as a default on an OS such as Windows (trademark, distributed by Microsoft Corporation) and uses a protocol installed in the OS as a default, it is not necessary to install a new driver each time the OS is updated.

In the signal converter according to the above aspect of the invention, the second communication unit is preferably adapted to receive a request signal from the signal processor, and the conversion controller preferably selects one of the first signal conversion unit and the second signal conversion unit based on the request signal received by the second communication unit, selected one of the first and the second signal conversion units performing the conversion of the measurement signal.

Generally, in a so-called composite device that is capable of communication according to a plurality of interface protocols with a single USB port, when, for instance, the HID keyboard protocol is enabled as the first communication protocol, the key input in accordance with the HID keyboard protocol is sometimes generated for transmitting/receiving the communication data according to other protocols. Accordingly, when a signal according to the second communication protocol is transmitted to the signal processor, an additional complicated work for masking the key input from the keyboard or disabling the signal input according to the HID keyboard protocol inputted by the signal converter by a device manager or the like becomes necessary.

On the other hand, since the signal format of the measurement signal of the signal converter is switched in accordance with the request signal inputted by the signal processor, the measurement signal according to the first communication protocol and the measurement signal according to the second communication protocol are not simultaneously inputted to the signal processor. Accordingly, when a measurement signal according to one of the first and the second protocols is inputted, it is not necessary to, for instance, disable the input of the measurement signal according to the other protocol, so that the measurement signal can be inputted to the signal processor with a simple operation.

Further, it is not necessary to separately provide a switch or the like on the signal converter, so that the communication protocol can be switched with a simple arrangement.

In the signal converter according to the above aspect of the invention, when the conversion controller recognizes the request signal, the conversion controller preferably converts the measurement signal by the second signal conversion unit and when the conversion controller does not recognize the request signal, the conversion controller preferably converts the measurement signal by the first signal conversion unit.

In the above arrangement, the signal processor normally processes the measurement signal inputted by the first driver (e.g. HID driver). In this case, the second driver (e.g. VCP driver) does not output the request signal. The signal converter converts the signal format of the measurement signal into a signal format according to the first communication protocol (e.g. HID keyboard protocol) by the first signal conversion unit before outputting the measurement signal to the signal processor. Accordingly, in the signal processor, the application software capable of processing the measurement signal in the signal format according to the first communication protocol converts the signal format of the measurement signal inputted through the USB interface into the signal format according to the first communication protocol. Thus, when the first communication protocol is, for instance, the HID keyboard protocol, the measurement signal can be processed in the same manner as that inputted by an HID keyboard.

On the other hand, when an application software that requests a measurement signal in the signal format according to the second communication protocol (e.g. serial port protocol) is activated in the signal processor, the second driver (e.g. VCP driver) outputs the request signal for requesting the conversion by the second signal conversion unit to the signal converter. The conversion controller that recognizes the request signal switches the signal conversion of the measurement signal by the first signal conversion unit to the signal conversion of the measurement signal by the second signal conversion unit. Thus, the signal according to the first communication protocol is disabled in the signal processor and the signal according to the second communication protocol is processable. When, for instance, the VCP protocol is used as the second communication protocol, the USB interface emulates the serial port interface so that the measurement signal is processed in a manner equal to a signal inputted through the serial port interface.

As described above, since the protocol for converting the measurement signal is switched in the signal converter in accordance with the request signal inputted by the signal processor, the signal can be easily inputted from the signal converter to the signal processor without requiring a complicated operation, thereby providing a signal converter capable of performing a signal conversion with a wide applicability.

In the signal converter according to the above aspect of the invention, the request signal preferably includes a first switching request signal that requests the conversion of the measurement signal by the first signal conversion unit and a second switching request signal that requests the conversion of the measurement signal by the second signal conversion unit, when the conversion controller recognizes the first switching request signal in the signal processor, the conversion controller preferably converts the measurement signal by the first signal conversion unit, and when the conversion controller recognizes the second switching request signal in the signal processor, the conversion controller preferably converts the measurement signal by the second signal conversion unit.

In the above arrangement, the signal format of the measurement signal is switched upon recognizing either one of the first switching request signal and the second switching request signal. In the above arrangement, since the protocol for converting the measurement signal is switched in the signal converter in accordance with the first or the second switching request signal inputted by the signal processor, the signal can be easily inputted from the signal converter to the signal processor without requiring a complicated operation, thereby providing a signal converter capable of performing a signal conversion with a wide applicability.

In the above aspect of the invention, the second communication interface is preferably a USB connection interface, the first signal conversion unit preferably converts the measurement signal into a signal format according to the HID keyboard protocol, the signal processor preferably has an HID driver that is capable of processing a signal according to the HID keyboard protocol inputted by the USB connection interface and is connected with an input operation device that is capable of signal processing by the HID driver, and the second switching request signal is preferably an Output report issued in response to a specific key input received from the input operation device.

In the above arrangement, the input operation device refers to a device such as a keyboard and a mouse that is capable of signal processing according to the HID keyboard protocol.

Usually, according to the HID keyboard protocol, an Output report is broadcasted to all of the HID keyboard devices connected to the signal processor. For instance, when a plurality of keyboard devices are connected to the signal processor and a predetermined key (e.g. Num Lock key) of one of the devices is pressed, Num Lock LEDs of all other devices connected to the signal processor are lit. In other words, when a predetermined key input signal is sent to the signal processor while the input operation devices capable of signal processing by the HID driver and the signal converter are connected to the signal processor, the key input signal is transmitted also to the signal converter as the Output report. The signal converter of the above aspect of the invention recognizes the Output report as the second switching request signal and converts the signal format of the measurement signal.

According to the above arrangement, the signal format of the measurement signal can be switched with a simple arrangement without employing special application software.

The signal converter according to the above aspect of the invention preferably include an operation unit that is capable of setting the signal format of the measurement signal, in which the conversion controller preferably makes one of the first converter and the second converter to convert the signal format of the measurement signal in accordance with a setting of the operation unit.

In the preceding arrangement, the signal format of the signal converter is switched according to the request signal inputted by the signal processor. In contrast, in the above arrangement, the conversion controller selects one of the first and the second signal conversion units based on the operation signal inputted by the operation unit to convert the signal format of the measurement signal. According to such an arrangement, the signal can be easily inputted from the signal converter to the signal processor without performing complicated operations, thereby providing a signal converter that is capable of performing a signal conversion with a wide applicability. Especially, when the measurement signal is transmitted from the signal converter to the signal processor, a user not accustomed to the signal processor may not be able to correctly convert a signal format of the measurement signal on account of erroneous operation. However, since it is only necessary to operate the switch in the above arrangement, the signal format in the signal converter can be easily switched.

A signal processor according to another aspect of the invention is connectable to a signal converter connected with a measuring instrument that outputs a measurement signal obtained by a predetermined measurement via a first communication interface to convert a signal format of the measurement signal into a signal transmission format that is capable of being inputted to a USB connection interface, the signal processor processing the measurement signal received from the signal converter, the signal processor including: a device detector that performs an automatic device detection when the signal processor is connected; an application software that processes data of the measurement signal; a signal format recognizer that recognizes the signal format of the measurement signal requested by the application software; an HID driver that processes a signal according to an HID keyboard protocol inputted through the USB connection interface; and a virtual serial port driver that views the USB connection interface as a serial port interface and is capable of processing the signal inputted through the USB interface according to a serial port protocol, in which, when the signal format recognizer recognizes that the signal format requested by the application software is a signal format corresponding to the serial port protocol, the virtual serial port driver outputs a request signal that requests the measurement signal in the signal format corresponding to the serial port protocol to the signal converter through the USB connection interface after completing the automatic device detection by the device detector.

In the above aspect of the invention, the VCP driver of the signal processor outputs the request signal when the signal converter is connected and the automatic device detection is completed, i.e. when the enumeration is completed. Thus, as described above, the signal converter can switch the mode from the signal conversion by the first signal conversion unit to the signal conversion by the second signal conversion unit, so that the measurement signal corresponding to the API of the application software can be inputted to the signal processor.

A signal conversion transmission system according to further aspect of the invention includes: a measuring instrument that performs a predetermined measurement and outputs a measurement signal obtained by the measurement; the signal converter according to the first aspect of the invention; and the signal processor according to the second aspect of the invention.

Accordingly, as in the above-described aspect of the invention, even when different APIs are requested by the application software run on the signal processor, the signal converter can convert the signal format of the measurement signal in response to the request signal into a signal format corresponding to the API, so that the measurement signal outputted by the measuring instrument can be inputted to the signal processor in an appropriate signal format, thus performing a signal conversion with a wide applicability. Further, since it is not necessary to produce a separate conversion chip or manufacture a plurality of signal converters with different second communication interfaces, the cost of the system can be reduced.

BRIEF DESCRIPTION OF THE DRAWINGS

FIG. 1 is a diagram showing an outline of a signal conversion transmission system according to a first exemplary embodiment of the invention.

FIG. 3 is a block diagram showing an overall arrangement of a PC (signal processor) according to the first exemplary embodiment.

FIG. 17 shows protocols for switching measurement signals in response to DATA signal and CK signal of the digimatic interface in an input tool according to a fifth exemplary embodiment of the invention.

DETAILED DESCRIPTION OF PREFERRED EMBODIMENT(S)

First Exemplary Embodiment

1. Entire Arrangement of Signal Conversion Transmission System

Exemplary embodiment(s) of the invention will be described below with reference to the attached drawings.

FIG. 1 is a diagram showing an outline of a signal conversion transmission system according to a first exemplary embodiment.

As shown in FIG. 1, a signal conversion transmission system 1 includes a measuring instrument 10, a personal computer 20 (signal processor: referred to as PC 20 hereinafter) and an input tool 30 (signal converter). The signal conversion transmission system 1 transmits measurement signals outputted from the measuring instrument 10 to the PC 20 via the input tool 30. The signal conversion transmission system 1 converts the measurement signals outputted by the measuring instrument 10 into a format processable by the PC 20 and outputs the converted measurement signals to the PC 20.

Structure of Measuring Instrument

Figure 2A:
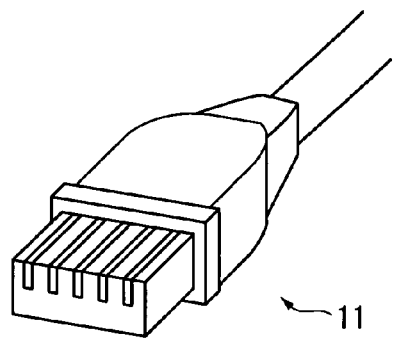
FIG. 2A is a perspective view showing an example of a digimatic (trademark) interface compatible with a flat connector provided on a measuring instrument including a digimatic output.
Figure 2B:
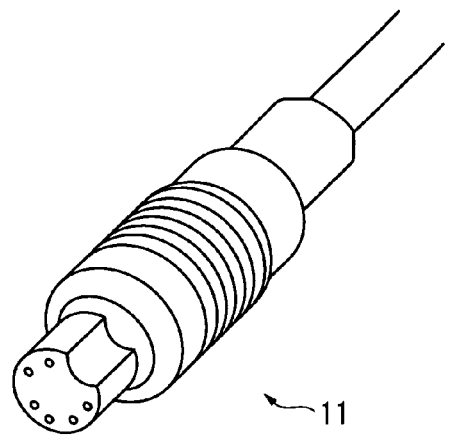
FIG. 2B is a perspective view showing another example of a digimatic (trademark) interface compatible with a circular 6-pin connector provided on a measuring instrument including a digimatic output.
Figure 2C:
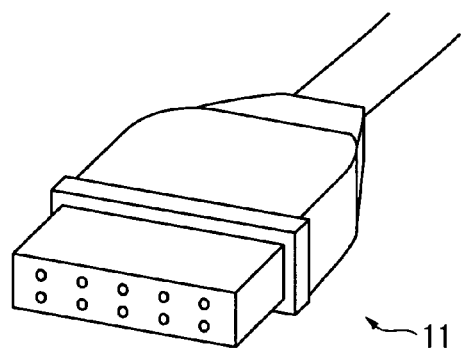
FIG. 2C is a perspective view showing a further example of a digimatic (trademark) interface compatible with a flat 10-pin connector provided on a measuring instrument including a digimatic output.

The measuring instrument 10 (a measuring instrument with digimatic (trademark) output) conducts a predetermined measurement processing to generate a measurement signal in accordance with the measurements. As shown in FIG. 1, the measuring instrument 10 has a digimatic interface 11 (first communication interface: digimatic I/F 11). The measurement signals are outputted through a cable connected to the digimatic I/F 11. The digimatic I/F 11 is an interface unique to the measuring instrument 10. The digimatic I/F 11 is capable of receiving, for instance, a connection of a flat connector shown in FIG. 2A, a circular 6-pin connector shown in FIG. 2B and a flat 10-pin connector shown in FIG. 2C.

Incidentally, though a caliper gauge that is capable of measuring a length of an object is illustrated as an example of the measuring instrument 10, the measuring instrument 10 is not limited to a caliper gauge but may alternatively be other measuring instruments including a length-measuring instrument such as a micrometer, a height gauge, a depth gauge and an inner-diameter gauge; other measuring instrument such as coordinate measuring machine, image measuring machine, profile measuring machine and an engineering measuring machine; and a measuring machine that measures a temperature, humidity of an object, a pressure applied on an object and velocity of a fluid and the like.

1-1. Structure of PC

Next, the structure of the PC 20 will be described below with reference to the attached drawing. FIG. 3 is a block diagram showing an overall arrangement of the PC 20.

As shown in FIG. 3, the PC 20 includes an I/O unit 21, a memory 22, an HDD 23 and a CPU 24. Though the signal processor is exemplified by a desktop personal computer in this exemplary embodiment, any information processor that is capable of processing measurement signals may be used. For instance, the signal processor may be a notebook computer, a handheld terminal (PDA: Personal Digital Assistant) and measurement-dedicated devices.

The I/O unit 21 includes a USB connection interface (second communication interface: USB I/F) 211, an image-output interface such as DVI (Digital Visual Interface) to which a display device can be connected and the like.

Input devices such as a keyboard and a mouse and other peripheral devices can be connected to the USB interface 211. The input tool 30 (signal converter of the invention) is also connected to the USB interface 211. The USB interface 211 outputs a signal inputted through the input tool 30, an input device and a peripheral device to the CPU 24.

The memory 22 includes a ROM and RAM. Programs run on an OS that controls the PC 20 are stored in the ROM. The programs stored in the ROM include, for instance, a firmware that cannot be updated (e.g. rewrite) during the operation of the PC 20. The RAM is used as, for instance, a work space for the programs executed by the CPU 24.

The HDD 23 readably stores the various programs run by the CPU 24 and various data used by the programs. The program and data are read and are processed by the CPU 24 to perform various information processing. Incidentally, the programs and the data may alternatively be stored in the memory 22.

Figure 4:
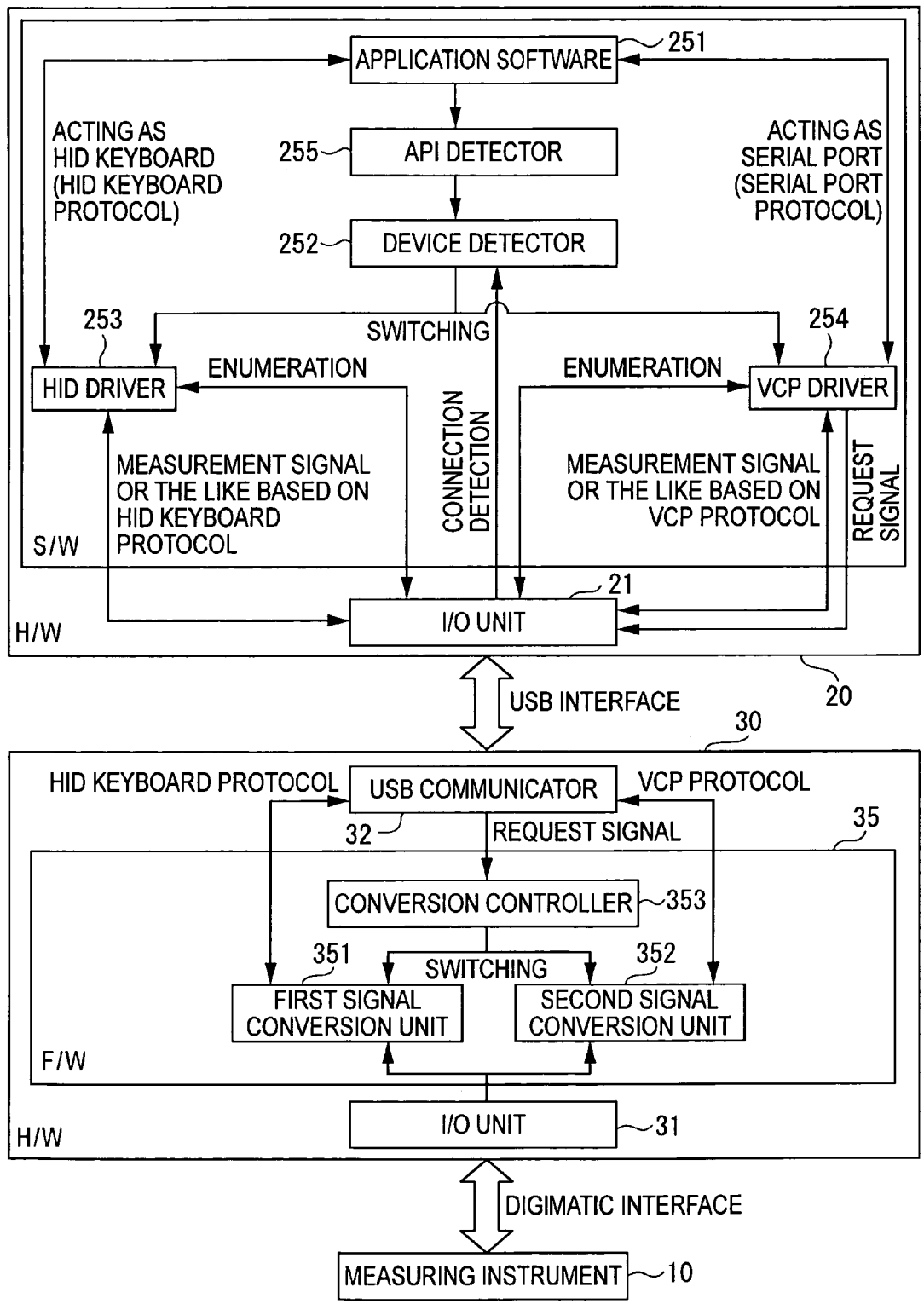
FIG. 4 is a diagram showing an outline of signal transmission in a signal conversion transmission system according to the first exemplary embodiment.

FIG. 4 is a diagram showing an outline of a signal transmission in the signal conversion transmission system 1.

The program stored in the HDD 23 and run by the CPU 24 includes an OS (Operation System) for controlling the entire operation of the PC 20, various device drivers run on the OS for controlling devices connected to the PC 20 or the devices constituting the PC 20, and various application software (S/W) 251 run on the OS. A device detector 252 that automatically recognizes a device when the device is connected to the I/O unit 21 (i.e. so-called enumeration) is implemented on the OS.

The driver that controls the respective devices includes an HID driver 253 that recognizes the HID keyboard connected to the USB interface 211 as a device and processes input signals from the HID keyboard according to USB-HID keyboard protocol (i.e. input signals inputted by the HID keyboard) as a predetermined command. Incidentally, though Windows (trademark: distributed by Microsoft Corporation) inherently installed with the HID driver 253 is employed as the OS stored in the HDD 23, when the OS does not include the HID driver 253 as a default, the HID driver 253 can be installed in the HDD 23 by, for instance, downloading the HID driver via the Internet or reading the HID driver from a storage medium such as a CD-ROM and an FD.

The driver also includes a virtual serial port driver (VCP driver 254). The VCP driver 254 emulates the USB interface 211 as a serial port and processes the signals inputted by the USB interface 211 as signals inputted via a serial port interface. The VCP driver 254 generates, when the API of the application software 251 for processing the measurement signal accords to the signal format inputted via the serial port interface, a request signal bearing a VCP-mode switching command that requests a measurement signal in a signal format in accordance with the VCP protocol and outputs the request signal from the USB interface 211 to the input tool 30. When the measurement signal in accordance with the VCP protocol is inputted from the input tool 30, the VCP driver 254 recognizes the measurement signal and outputs the measurement signal to the application software 251.

The HDD 23 also stores the application software 251 that receives the measurement signal outputted by the measuring instrument and conducts data processing of a measurement value based on the measurement signal such as display of the measurement value (individual value or list of values), collection of the measurement data and arithmetic processing using the measurement data. The application software 251 is exemplified by an HID-enabled application software that has an API that is adapted to receive a signal in compliance with the HID keyboard protocol to be processed by the HID driver 253. Specific examples of the application software are: spreadsheet software such as Excel (distributed by Microsoft Corporation) and Lotus 1-2-3 (distributed by Lotus Software); and measurement data collection application software such as MeasureReport (distributed by Mitutoyo Corporation) and MeasureLink (distributed by Mitutoyo Corporation).

The application software 251 includes a serial-port-enabled application software independently created by a user and adapted to an API of signals according to a serial port protocol to be processed by the VCP driver 254, where the measurement signal processed by the VCP driver 254 is used as the input signal. The application software 251 also includes an application software that is adapted to output an input request signal for urging an input of a measurement signal, which may be in bidirectional communication with the input tool 30 via the serial port in order to perform a complicated operation control and data processing. Incidentally, the above HID-enabled application software such as Excel, Lotus 1-2-3, MeasureReport and MeasureLink are also capable of processing measurement signals according to a serial port protocol to be processed by the VCP driver 254, so that the formats of the inputted measurement signals can be selected as desired.

An API detector 255 (signal format recognizer) for detecting the API of the application software 251 when the above application software 251 that deals with the measurement signal is activated is provided in the form of a program stored in the HDD 23. When, for instance, an HID-enabled application software is activated, the API detector 255 detects whether the API accords with an HID keyboard protocol or a serial port protocol.

The device detector 252 switches the driver to be used in accordance with the detected one of the protocols. Specifically, when it is detected that the API is adapted to the serial port protocol by the API detector 255, the device detector 252 starts the VCP driver 254 and the enumeration using the VCP driver 254 is performed. After the enumeration is completed, as described above, the VCP driver 254 outputs the request signal bearing the VCP mode switching command to the input tool 30. On the other hand, when it is detected that the API accords with the HID keyboard protocol by the API detector 255, the device detector 252 starts the HID driver 253 and the enumeration using the HID driver is performed. At this time, the VCP driver 254 is not activated and no processing is conducted by the VCP driver 254.

1-2. Structure of Input Tool

Figure 5:
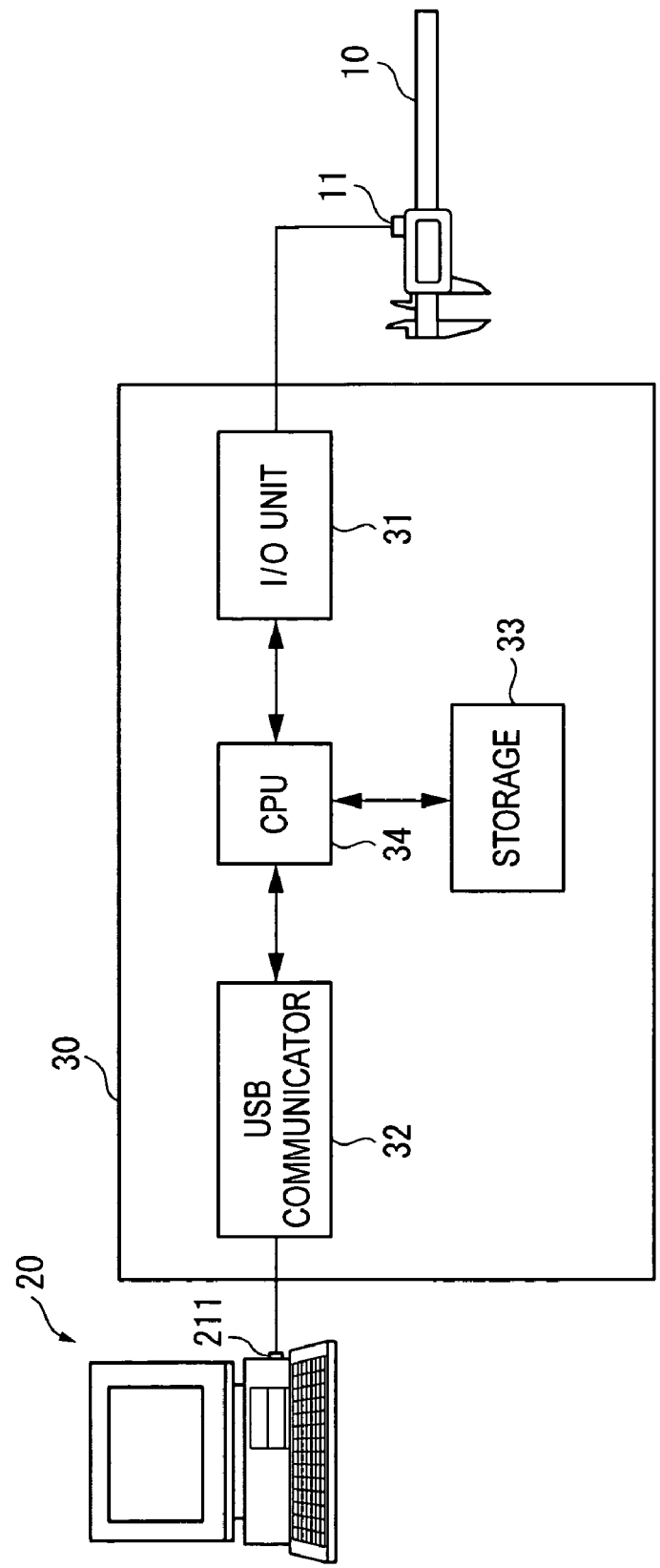
FIG. 5 is a block diagram showing an overall arrangement of an input tool according to the first exemplary embodiment.

Next, the structure of the input tool 30 (signal converter) will be described below with reference to the attached drawing. FIG. 5 is a block diagram showing an overall arrangement of the input tool.

As shown in FIG. 5, the input tool 30 includes an I/O unit 31, a USB communicator 32, a storage 33 and a CPU 34.

The I/O unit 31 has a terminal to be connected with a cable provided with a connector (see FIGS. 2A, 2B and 2C) that is connectable with the digimatic interface 11 provided on the measuring instrument 10. The I/O unit 31 and the digimatic interface 11 of the measuring instrument 10 are connected so that the measurement signal can be inputted from the measuring instrument 10. The measurement signal inputted by the measuring instrument 10 is defined in accordance with a unique protocol (referred to as digimatic protocol hereinafter) that is communicatable via the digimatic interface 11. The input tool 30 of this exemplary embodiment converts the measurement signal in accordance with the digimatic protocol into the signal format according to either one of the HID keyboard protocol and the VCP protocol before outputting the measurement signal to the PC 20.

The I/O unit 31 is also capable of outputting a control signal inputted by the PC 20 to the measuring instrument 10, the control signal bearing a command for, for instance, urging a measurement process.

The USB communicator 32 includes a USB cable. A USB connector provided at an end of the USB cable is connected to the USB interface 211 of the PC 20 so that the input tool 30 and the PC 20 are connected in communication with each other. The USB communicator 32 may be provided with an interface connectable with a USB cable. Alternatively, for the purpose of reduction in production cost, the USB communicator 32 may not be connected via a USB cable but may be provided with an interface having a USB connector directly on an exterior thereof, such as those seen in a commercially available USB flash memory.

The storage 33 is provided with a recording medium such as a ROM. A control program for controlling the input tool 30 (i.e. a firmware 35: see FIG. 4) is stored in the ROM.

The CPU 34 reads out the firmware 35 stored in the storage 33 and sequentially performs processing based on the firmware 35.

The firmware 35 stored in the storage 33 and processed by the CPU 34 includes a first signal conversion unit 351, a second signal conversion unit 352 and a conversion controller 353 shown in FIG. 4.

The first signal conversion unit 351 converts the measurement signal in a signal format according to the digimatic protocol that is inputted to the I/O unit 21 into a signal format according to the HID keyboard protocol.

The second signal conversion unit 352 converts the measurement signal in a signal format according to the digimatic protocol that is inputted to the I/O unit 21 into a signal format according to the serial port protocol.

The conversion controller 353 effects switching between the first signal conversion unit 351 and the second signal conversion unit 352 so that the measurement signal is converted by one of the first signal conversion unit 351 and the second signal conversion unit 352. Specifically, when a request signal is not inputted by the PC 20, the conversion controller 353 selects the first signal conversion unit 351 to convert a signal format of the measurement signal into a signal format according to the HID keyboard protocol and output the converted measurement signal to the PC 20 via the USB communicator 32. On the other hand, when a request signal bearing the VCP mode switching command is inputted by the PC 20, the conversion controller 353 switches the first signal conversion unit 351 to the second signal conversion unit 352 to convert the signal format of the measurement signal in a format according to the VCP protocol and outputs the measurement signal to the PC 20. The mode switching from the second signal conversion unit 352 to the first signal conversion unit 351 may alternatively be effected when no request signal bearing a VCP mode conversion command is inputted after the PC 20 and the input tool 30 are once disconnected and are connected again, or, alternatively, may be effected when receiving a request signal bearing a HID mode conversion command from the PC 20.

2. Operation of Signal Conversion Transmission System

The signal transmission processing of the above-described signal conversion transmission system will be described below.

Figure 6:
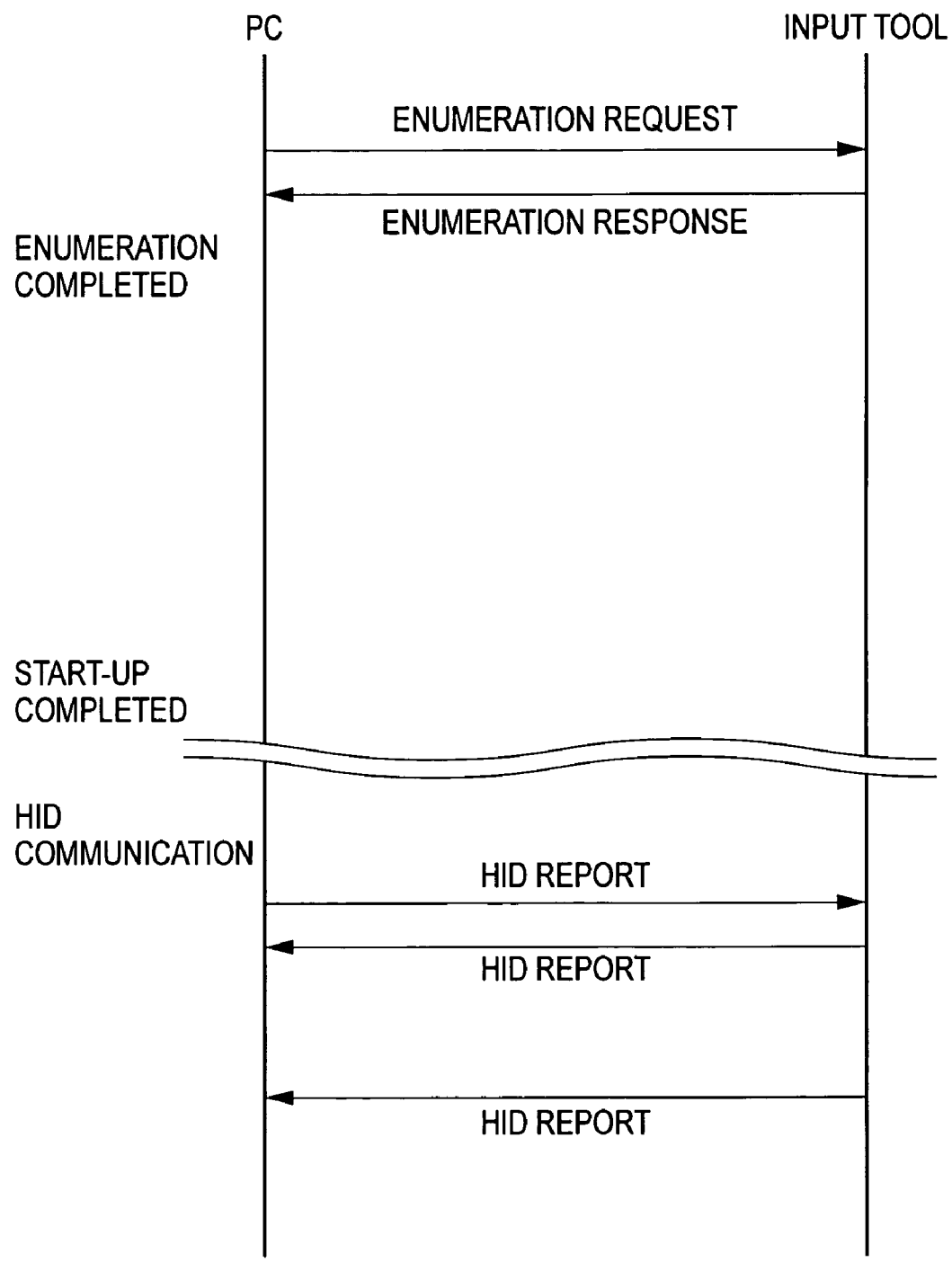
FIG. 6 is a conceptual drawing showing a process for a signal conversion based on HID keyboard protocol in the input tool according to the first exemplary embodiment.
Figure 7:
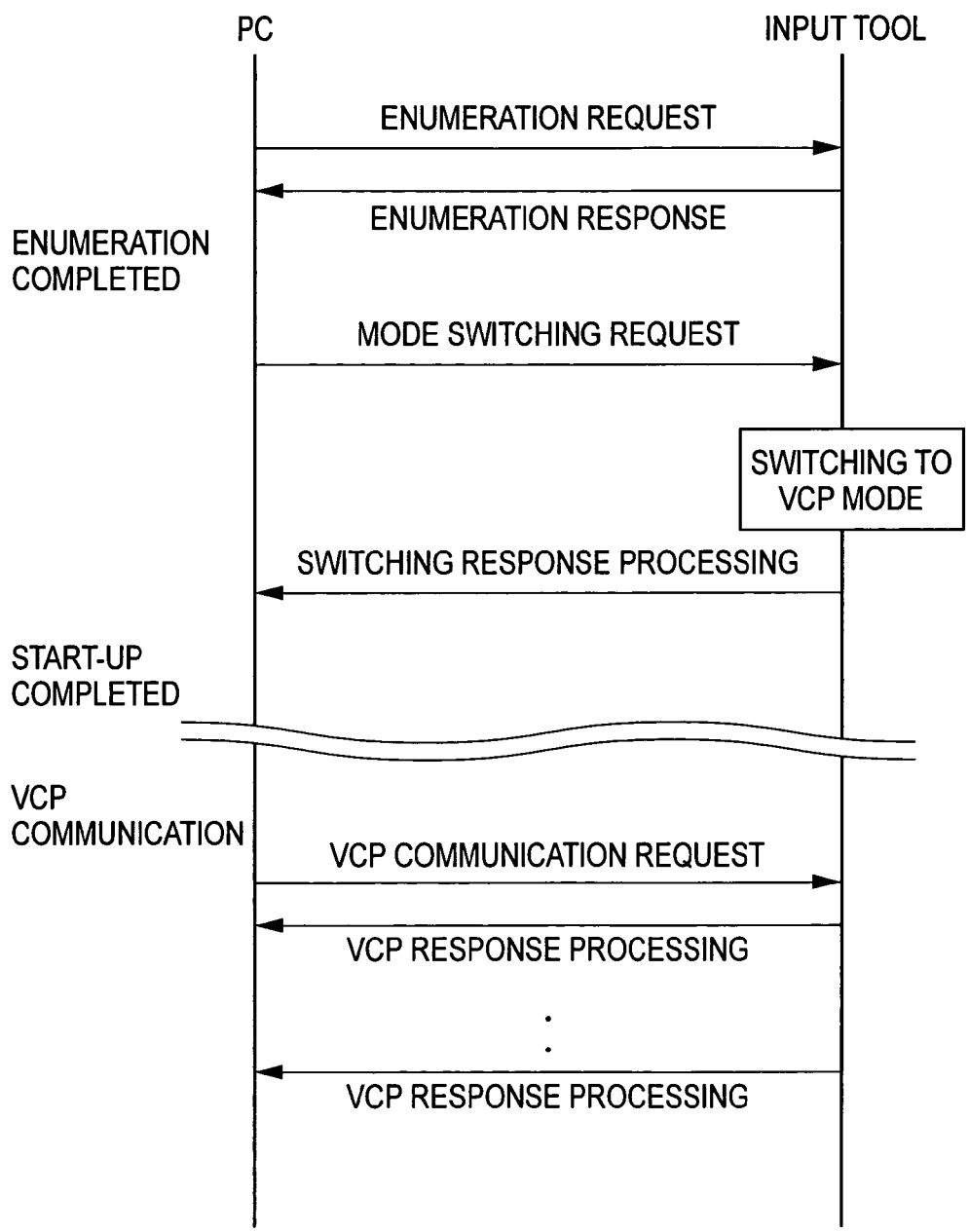
FIG. 7 is another conceptual drawing showing a process for a signal conversion based on VCP protocol in the input tool according to the first exemplary embodiment.
Figure 8:
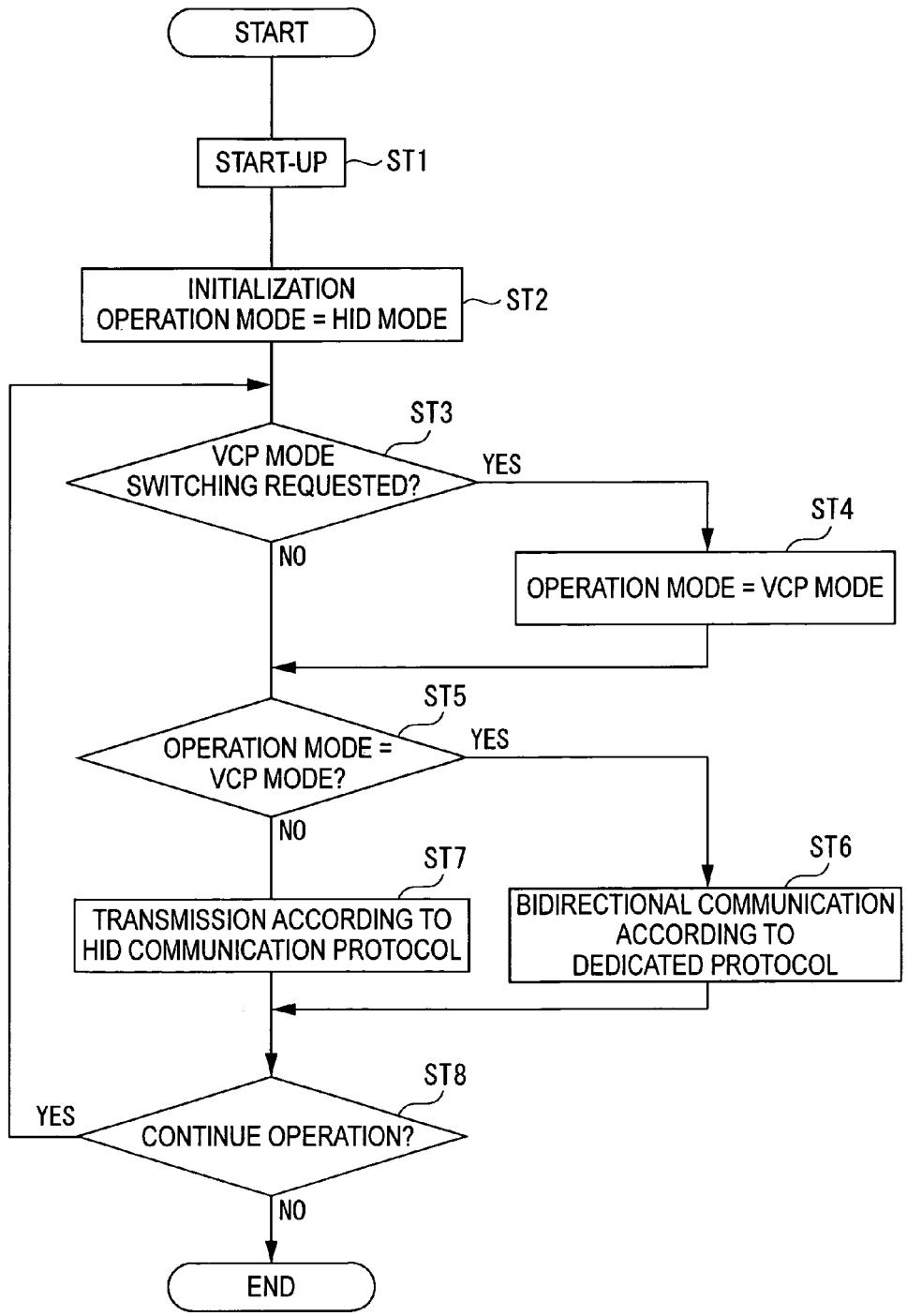
FIG. 8 is a flowchart showing a firmware processing of the input tool according to the first exemplary embodiment.

FIG. 6 is a conceptual drawing showing a process for a signal conversion based on the HID keyboard protocol in the input tool. FIG. 7 is another conceptual drawing showing a process for a signal conversion based on the VCP protocol in the input tool. FIG. 8 is a flowchart showing processing of a firmware of the input tool.

In order to output the measurements of the measuring instrument 10 to the PC 20, a user connects the measuring instrument 10 and the PC 20 via the input tool 30 as shown in FIG. 1.

When the input tool 30 is connected, the PC 20 performs the enumeration processing to recognize the input tool 30. When the PC 20 judges that the application software 251 that requires a serial port interface as the API is activated based on the detection results of the API detector 255, the device detector 252 activates the VCP driver 254 to perform the enumeration processing. Then, after the enumeration processing is completed, the VCP driver 254 outputs the request signal bearing the VCP mode switching command to the input tool 30. On the other hand, when the PC 20 judges that the application software 251 that requires a serial port interface as the API is not activated, the device detector 252 activates the HID driver 253 to perform the enumeration processing. At this time, since the VCP driver 254 is not activated, the request signal is not outputted so that an operation equivalent to an HID keyboard is performed by the input tool 30.

Next, the operation of the input tool 30 of the signal conversion transmission system 1 will be described below.

When the input tool 30 is connected to the measuring instrument 10 and the PC 20, the start-up process is initiated by the power supplied by the PC 20 (Step ST1). At this time, as described above, the enumeration processing is performed by the device detector 252 of the PC 20. Specifically, as shown in FIGS. 6 and 7, the input tool 30 returns an enumeration response signal to the PC 20 when an enumeration request signal is inputted from the PC 20 to the input tool 30. Thus, the PC 20 detects the input tool 30 as a device.

Next, the input tool 30 is initialized to set the operation mode thereof as the HID mode (Step ST2). Specifically, the firmware 35 of the input tool 30 initializes the input tool 30 so that the measurement signal inputted by the measuring instrument 10 is converted into a signal format in compliance with the HID protocol, i.e. so that the measurement signal is adapted to be converted by the first signal conversion unit 351.

Subsequently, the firmware 35 of the input tool 30 judges whether a request signal bearing a VCP mode switching command is inputted from the VCP driver 254 of the PC 20 or not (Step ST3).

When the request signal is inputted by the PC 20 as shown in FIG. 7, the conversion controller 353 of the firmware 35 switches the operation mode into a VCP mode, i.e. in a mode for the format of the measurement signal to be converted into a signal format based on the VCP protocol by the second signal conversion unit 352 (Step ST4).

When the request signal is not inputted by the PC 20 in Step ST3 as shown in FIG. 6 (or after Step ST4), the conversion controller 353 judges whether the currently-set mode is VCP mode or not (Step ST5).

When it is judged that the operation mode is VCP mode in Step ST5, the firmware 35 converts the measurement signal inputted via the digimatic interface 11 from the measuring instrument 10 into a signal format according to the VCP protocol by the second signal conversion unit 352. Then, in response to VCP communication request signal inputted by the PC 20, the input tool 30 outputs the measurement signal converted by the second signal conversion unit 352 to the PC 20 as VCP response processing signal, as shown in FIG. 7 (Step ST6).

When it is judged "No" in Step ST5, i.e. when it is judged that the operation mode is HID mode in Step ST5, the firmware 35 converts the measurement signal inputted via the digimatic interface 11 from the measuring instrument 10 into a signal format according to the HID keyboard protocol by the first signal conversion unit 351. Then, in response to an HID Report inputted by the PC 20, the input tool 30 outputs the measurement signal converted by the second signal conversion unit 352 to the PC 20 as a return HID Report, as shown in FIG. 6 (Step ST7).

Subsequently, the input tool 30 judges whether or not the operation should be continued (Step ST8).

In Step ST8, when, for instance, the communication between the input tool 30 and the PC 20 or between the input tool 30 and the measuring instrument 10 is disconnected, or when a disconnection processing with the input tool 30 is conducted in the PC 20, the input tool 30 terminates the series of the processing.

On the other hand, when the input tool 30, the PC 20 and the measuring instrument 10 are not disconnected in the step ST8 and the processing is continued, the operation returns back to the step ST3.

3. Advantages of Signal Conversion Transmission System

As described above, the signal conversion transmission system 1 of the present exemplary embodiment has the measuring instrument 10 that outputs the measurement signal; the PC 20 that processes the measurement signal and the input tool 30 connecting the measuring instrument 10 and the PC 20. The input tool 30 is connected to both the digimatic interface 11 of the measuring instrument 10 and the USB interface 211 of the PC 20 and transmits the measurement signal inputted by the digimatic interface 11 to the PC 20 after converting into a signal transmission format compatible with the USB interface 211. The input tool 30 has: the I/O unit 31 connected to the digimatic interface 11; the first signal conversion unit 351 incorporated in the firmware 35, the first signal conversion unit 351 converting the measurement signal in a signal format according to the USB HID keyboard protocol that is processable by the HID driver 253; the second signal conversion unit 352 incorporated in the firmware 35, the second signal conversion unit 352 converting the measurement signal in a signal format in compliance with the VCP protocol that is processable by the VCP driver 254; a conversion controller 353 that selects one of the first signal conversion unit 351 and the second signal conversion unit 352 based on the request signal inputted by the PC 20 and performs the conversion processing of the measurement signal by the selected one of the first and the second signal conversion units; and the USB communicator 32 connected to the PC 20 via the USB interface 211.

Accordingly, when the application software 251 that is capable of data processing (e.g. data collection) in response to input of data according to the HID keyboard protocol is run by the PC 20, the input tool 30 conducts the signal conversion by the first signal conversion unit 351 and transmits the converted measurement signal to the PC 20 via the USB interface 211. At this time, the PC 20 processes the measurement signal by the HID driver 253 and transfers the processed measurement signal to the application software 251 as inputted data, so that the measurement signal can be processed in the same manner as data inputted by an HID keyboard.

On the other hand, when the API of the application software 251 run by the PC 20 requests the data in a signal format according to the serial port protocol, the conversion controller 353 of the input tool 30 switches the measurement signal conversion processing from the first signal conversion unit 351 to the second signal conversion unit 352 based on the request signal bearing the VCP mode switching command inputted by the PC 20 and outputs the converted measurement signal to the PC 20 via the USB interface 211. At this time, the PC 20 processes the measurement signal by the VCP driver 254 and transfers the processed measurement signal to the application software 251 as the inputted data. Accordingly, when the application software 251 that requires input data according to the serial port protocol is run, the measurement signal can be inputted to the PC 20 in a manner capable of processing the measurement signal from the measuring instrument 10 by the application software 251 without exchanging the input tool 30.

Thus, the input tool 30 is capable of converting the measurement signal in a signal format compatible with different APIs of the application software 251 run by the PC 20.

Accordingly, the signal can be transmitted from the measuring instrument 10 to the PC 20 without providing a connecting device that performs a signal conversion based on the HID keyboard protocol and a connecting device that performs a signal conversion based on the serial port protocol or providing both of a connecting device provided with a USB interface and a connecting device provided with a serial port interface, or without installing a separate conversion chip in the input tool 30. In other words, since the structure of the signal conversion transmission system 1 can be simplified and there is no need for producing a plurality of connecting devices, the production cost can be reduced.

Further, the input tool 30 has the USB communicator 32 provided with the USB interface 211 and supplies the measurement signal to the PC 20 via the USB interface 211. The PC 20 processes the inputted measurement signal by the HID driver 253 installed as a default in the OS.

Thus, when the API of the application software 251 run by the PC 20 supports the signal format according to the HID keyboard protocol, the inputted measurement signal can be transferred to the application software 251 in the same operation as the input signal inputted by a keyboard without requiring separate conversion processing and the like by the PC 20. Accordingly, advanced programming technique is not required for the application software 251 for processing the data from the measuring instrument but the processing can be achieved with a simple programming, thereby reducing the production cost of the application software 251.

In the VCP mode, the second signal conversion unit 352 of the input tool 30 converts the measurement signal based on the VCP protocol and outputs the measurement signal to the PC 20 via the USB interface 211. The PC 20 has the VCP driver 254 that emulates a serial port by the USB interface and processes the signals inputted via the USB interface 211 as signals inputted according to the serial port protocol.

Thus, the application software 251 of the PC 20 is capable of processing the measurement signal inputted via the USB interface 211 in the same manner as the measurement signal inputted via the serial port interface.

When the request signal bearing a VCP mode switching command outputted by the VCP driver 254 of the PC 20 is not recognized, the conversion controller 353 of the input tool 30 converts the measurement signal by the first signal conversion unit 351. When the request signal is recognized, the conversion controller 353 switches the program for the signal conversion processing to the second signal conversion unit 352.

In other words, the switching of the signal conversion in the input tool 30 is conducted only by the firmware 35 incorporated in the input tool 30 based on the request signal outputted by the VCP driver 254. Accordingly, the physical structure of the input tool 30 can be simplified, so that production efficiency of the input tool 30 can be improved and thus the production cost can be reduced. Further, it is also possible to update only the firmware while keeping the physical structure of the input tool 30, so that a signal conversion process corresponding to the newest version of driver can be performed.

The PC 20 has the device detector 252 that conducts the enumeration processing when the input tool 30 is connected, the application software 251 that performs the data processing of the measurement signal, the API detector 255 that recognizes the API requested by the application software 251, the HID driver 253 and the VCP driver 254. The device detector 252 selects and activates suitable one of the HID driver 253 and the VCP driver 254 with reference to the detection results of the API detector 255. When the VCP driver 254 is activated, the VCP driver 254 outputs the request signal bearing the VCP mode switching command to the input tool 30 after the enumeration processing is completed.

Thus, the input tool 30 is switched to an appropriate conversion mode upon being connected to the PC 20, so that the measurement signal of a signal format requested by the PC 20 can be properly outputted.

Second Exemplary Embodiment

Figure 9:
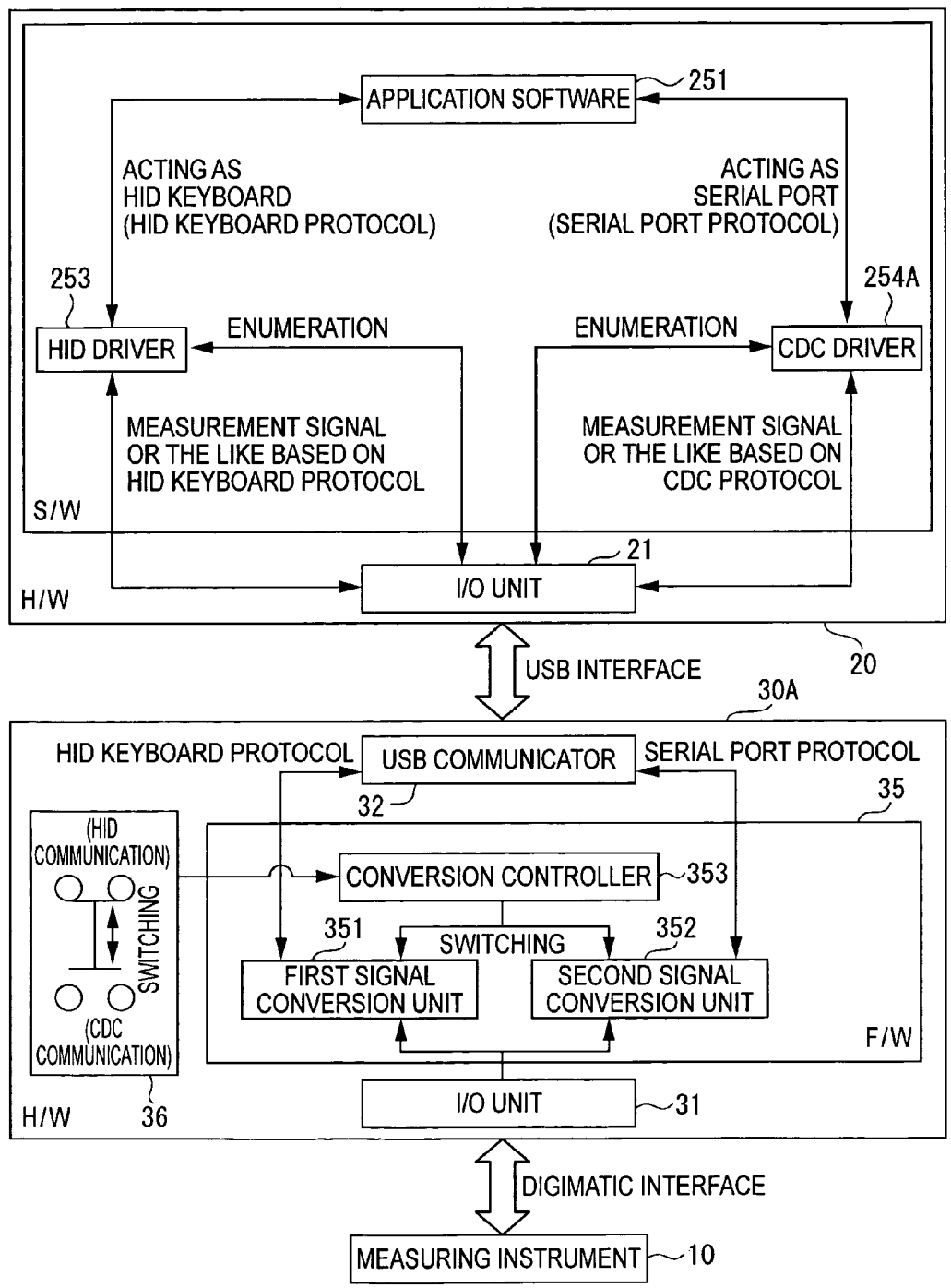
FIG. 9 is a diagram showing an outline of signal transmission in a signal conversion transmission system according to a second exemplary embodiment of the invention.

Next, a signal conversion transmission system according to a second exemplary embodiment of the invention will be described below with reference to the attached drawings. FIG. 9 is a diagram showing an outline of signal transmission in the signal conversion transmission system 1 according to the second exemplary embodiment of the invention. Incidentally, in the second exemplary embodiment, the same components as those in the first exemplary embodiment will be denoted by the same reference sign to omit or simplify the description thereof.

1. Entire Arrangement of Signal Conversion Transmission System

In the signal conversion transmission system 1 of the above-described first exemplary embodiment, the VCP driver 254 is installed in the PC 20 as the second driver. Since the VCP driver 254 is not a device driver installed as a default in an OS such as Windows (trademark), the VCP driver 254 has to be separately installed in the PC 20. In this case, when the OS is updated, the device driver also sometimes has to be updated in accordance with the new OS. Further, device drivers that are compatible with each of the old and new versions of OS have to be distributed. Thus, the manufacturer of the input tool 30 has to check the operation of the device driver each time the OS is updated and, when the device driver does not properly work, the device driver has to be revised or newly developed to meet the change in the OS. Further, troublesome work such as installation of a new device driver is imposed on users each time the OS of the PC 20 is updated.

The signal conversion transmission system 1 according to the second exemplary embodiment aims at an improvement in the above problem, which uses a CDC (Communication Device Class) driver installed as a default in the OS of the PC 20 as a virtual serial port driver.

Specifically, the signal conversion transmission system 1 according to the second exemplary embodiment includes the measuring instrument 10, the PC 20 (signal processor) and the input tool 30 (signal converter) in the same manner as the first exemplary embodiment.

The arrangement of the measuring instrument 10 will not be described below because of a similarity thereof to that in the above-described first exemplary embodiment.

1-1. Structure of PC

As shown in FIG. 3, the PC 20 has the same arrangement as that in the first exemplary embodiment and includes the I/O unit 21, the memory 22, the HDD 23 and the CPU 24.

Similarly to the first exemplary embodiment, the I/O unit 21 includes the USB interface 211 (the second communication interface of the invention) and the like.

Similarly to the first exemplary embodiment, the memory 22 includes a ROM and RAM. A program run on the OS that operates the PC 20 is stored in the ROM.

Similarly to the first exemplary embodiment, the HDD 23 readably stores the various programs run by the CPU 24 and various data used by the programs.

The program stored in the HDD 23 and run by the CPU 24 includes the OS for controlling the entire operation of the PC 20, various device drivers for controlling devices connected to the PC 20 or the devices constituting the PC 20, and the various applications software 251 run on the OS. The device detector 252 that automatically recognizes a device when the device is connected to the I/O unit 21 (i.e. so-called enumeration) is implemented on the OS.

The driver that controls the respective devices includes an HID driver 253 that recognizes the HID keyboard connected to the USB interface 211 as a device and processes input signals from the HID keyboard based on USB-HID keyboard protocol (i.e. input signals inputted by the HID keyboard) as a predetermined command. The HID driver 253 is provided by a part of standard drivers of the OS (e.g. Windows [trademark] distributed by Microsoft Corporation).

The driver also includes a CDC driver 254A. The CDC driver 254A is the second driver of the invention. The CDC driver 254A is capable of processing a signal according to the CDC (Communication Device Class) protocol, which is provided as a default in the OS (e.g. Windows). Similarly to the VCP driver 254 of the first exemplary embodiment, the CDC driver 254A is a virtual serial port driver for emulating a serial port by the USB interface 211. In other words, the CDC driver 254A is a program that processes the signals inputted by the USB interface 211 as signals inputted via a serial port interface.

Similarly to the first exemplary embodiment, the HDD 23 also stores the application software 251 that receives the measurement signal outputted by the measuring instrument 10 and conducts data processing of a measurement value based on the measurement signal (e.g. display of individual or list of the measurement values, collection of the measurement data and arithmetic processing using the measurement data).

Though the CDC protocol is exemplified as the second communication protocol and the CDC driver implemented as a part of standard drivers of the OS exemplarily serves as a virtual serial port driver in the second exemplary embodiment, the arrangement is not limited thereto. For instance, a USBTMC driver that is capable of signal processing based on GPIB (General Purpose Interface Bus) communication protocol and is provided by a third party may be used as the second driver. In this case, the USBTMC driver serves as a virtual GPIB driver that emulates a GPIB (General Purpose Interface Bus) communication by the USB interface 211.

The measurement signal can be converted into a signal format based on the CDC protocol and USBTMC protocol by the input tool 30A, so that the measurement signal according to the protocols can be inputted.

1-2. Structure of Input Tool

Figure 10:
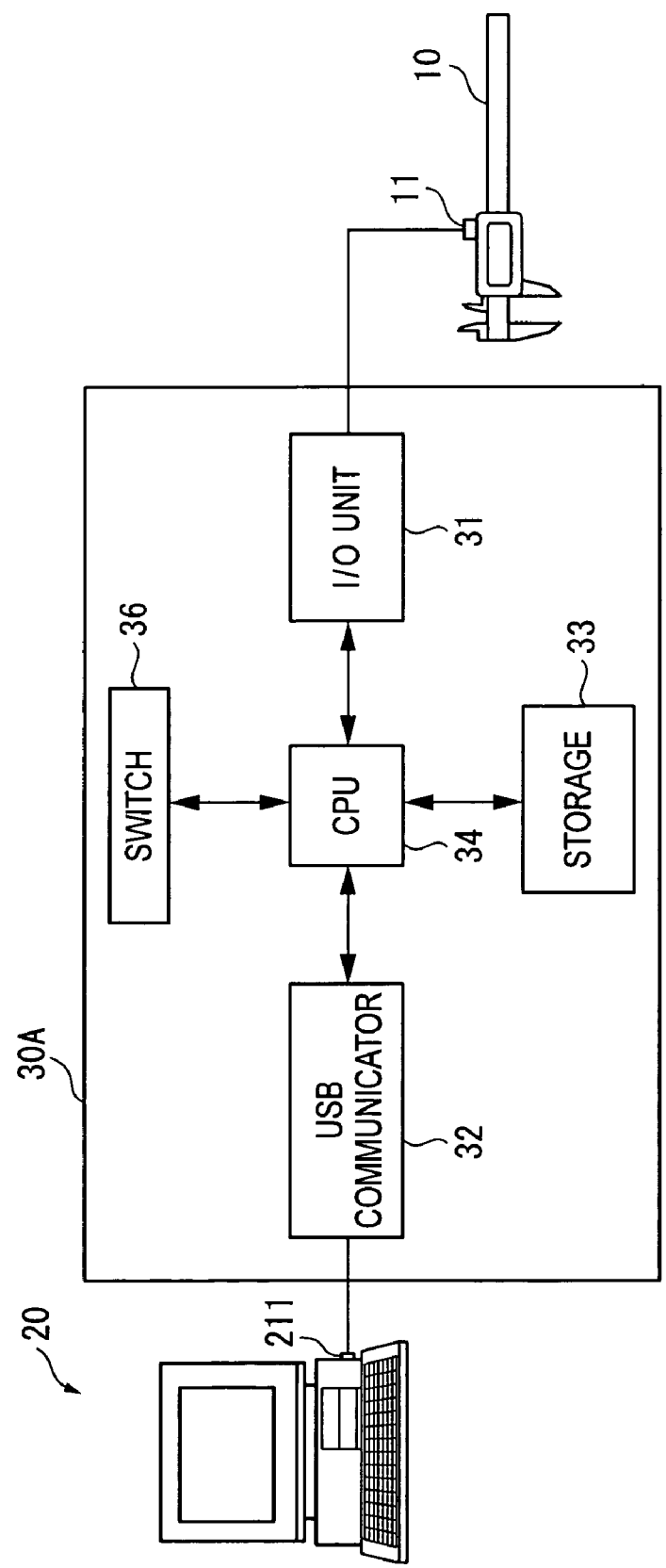
FIG. 10 is a block diagram showing an overall arrangement of an input tool according to the second exemplary embodiment.
Figure 11:
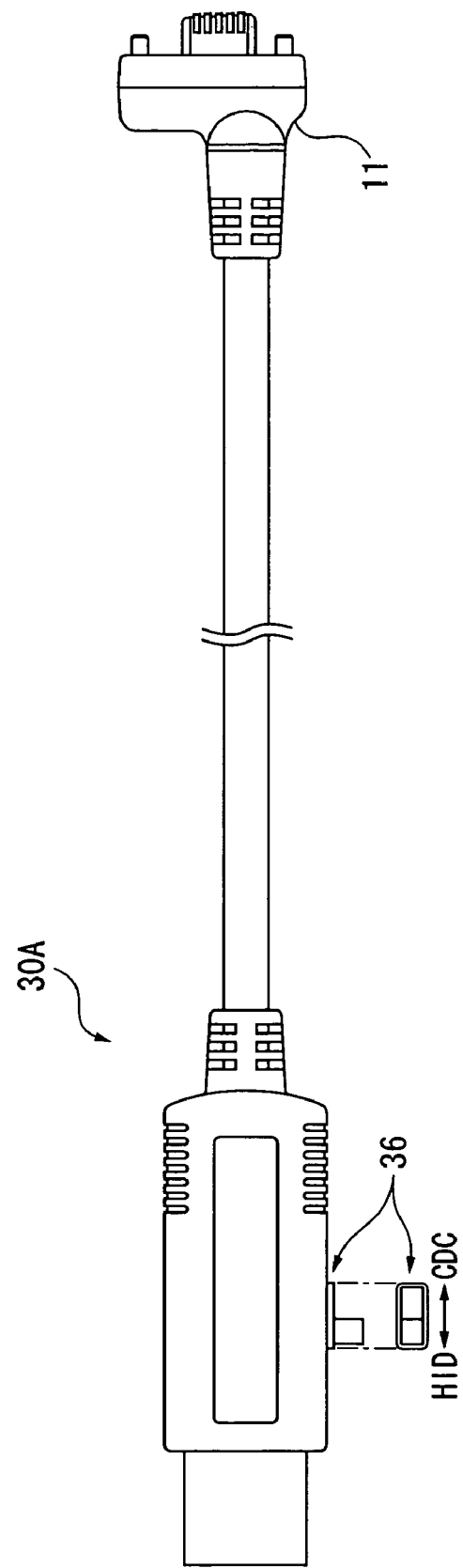
FIG. 11 shows an appearance of an input tool according to the second exemplary embodiment.

Next, the structure of the input tool 30A (signal converter) will be described below with reference to the attached drawing. FIG. 10 is a block diagram showing an overall arrangement of the input tool. FIG. 11 shows an appearance of the input tool.

The input tool 30A has approximately the same arrangement as the input tool 30 of the first exemplary embodiment, which includes the I/O unit 31, the USB communicator 32, the storage 33 and the CPU 34. As shown in FIGS. 10 and 11, the input tool 30A of the second exemplary embodiment has a switch 36 (operation unit of the invention) for switching the signal format of the measurement signal on an I/O port on an exterior of a casing.

The switch 36 switches the signal format of the measurement signal outputted from the measuring instrument 10 to the PC 20 to either one of a signal format according to the HID protocol and a signal format according to the CDC protocol. The switch 36 is manually operated by a user.

The CPU 34 of the input tool 30A monitors the setting of the switch 36 so that the signal is converted in accordance with the setting when the signal format of the measurement signal is converted.

Similarly to the first exemplary embodiment, the I/O unit 31 has a terminal to be connected with a cable provided with a connector (see FIGS. 2A, 2B and 2C) that is connectable with the digimatic interface 11 provided on the measuring instrument 10. The I/O unit 31 and the digimatic interface 11 of the measuring instrument 10 are connected so that the measurement signal can be inputted from the measuring instrument 10. Similarly to the first exemplary embodiment, the measurement signal inputted by the measuring instrument 10 is defined in accordance with a unique protocol (referred to as digimatic protocol hereinafter) that is communicatable via the digimatic interface 11. The input tool 30A of the second exemplary embodiment converts the measurement signal in accordance with the digimatic protocol into the signal format according to either one of the HID keyboard protocol and the CDC protocol before outputting the measurement signal to the PC 20.

Similarly to the first exemplary embodiment, a USB connector provided on the USB communicator 32 is connected to the USB interface 211 of the PC 20 so that the input tool 30A and the PC 20 are connected in communication with each other.

The storage 33 is provided with a recording medium such as a ROM. A control program for controlling the input tool 30 (i.e. a firmware 35: see FIG. 9) is stored in the ROM.

The CPU 34 reads out the firmware 35 stored in the storage 33 and sequentially performs processing based on the firmware 35.

Similarly to the first exemplary embodiment, the firmware 35 stored in the storage 33 and processed by the CPU 34 includes a first signal conversion unit 351, a second signal conversion unit 352 and a conversion controller 353.

The first signal conversion unit 351 converts the measurement signal in a signal format according to the digimatic protocol that is inputted to the I/O unit 21 into a signal format according to the HID keyboard protocol.

The second signal conversion unit 352 converts the measurement signal in a signal format according to the digimatic protocol that is inputted to the I/O unit 21 into a signal format according to the serial port protocol.

The conversion controller 353 effects switching between the first signal conversion unit 351 and the second signal conversion unit 352 so that the measurement signal is converted but one of the first signal conversion unit 351 and the second signal conversion unit 352. The conversion controller 353 of the second exemplary embodiment switches the signal format of the measurement signal in accordance with the setting of the above-described switch 36.

For instance, when the switch 36 is set to the side of "HID" in FIG. 11, the conversion controller 353 converts the measurement signal by the first signal conversion unit 351 into a signal format according to the HID keyboard protocol. On the other hand, when the switch 36 is set to the side of "CDC" in FIG. 11, the conversion controller 353 converts the measurement signal by the second signal conversion unit 352 into a signal format according to the serial port protocol.

Incidentally, though the input tool 30A is exemplarily adapted to switch the signal format of the measurement signal to be according to either one of the HID keyboard protocol and the serial port protocol that is processable by the CDC driver, the input tool 30A may be adapted further to switch the signal format, for instance, to accord with GPIB protocol that is processable by a USBTMC driver. In this case, a third signal conversion unit for converting the signal format of the measurement signal into a signal format according to the GPIB protocol may be provided in the firmware 35 stored in the storage 33 of the input tool 30A in addition to the first and second signal conversion units 351 and 352 and the switch 36 may be adapted to be switched to "USBTMC" position for performing the signal conversion by the third signal conversion unit in addition to the "HID" and "CDC" positions.

2. Operation of Signal Conversion Transmission System

The signal transmission processing of the above-described signal conversion transmission system will be described below.

Figure 12:
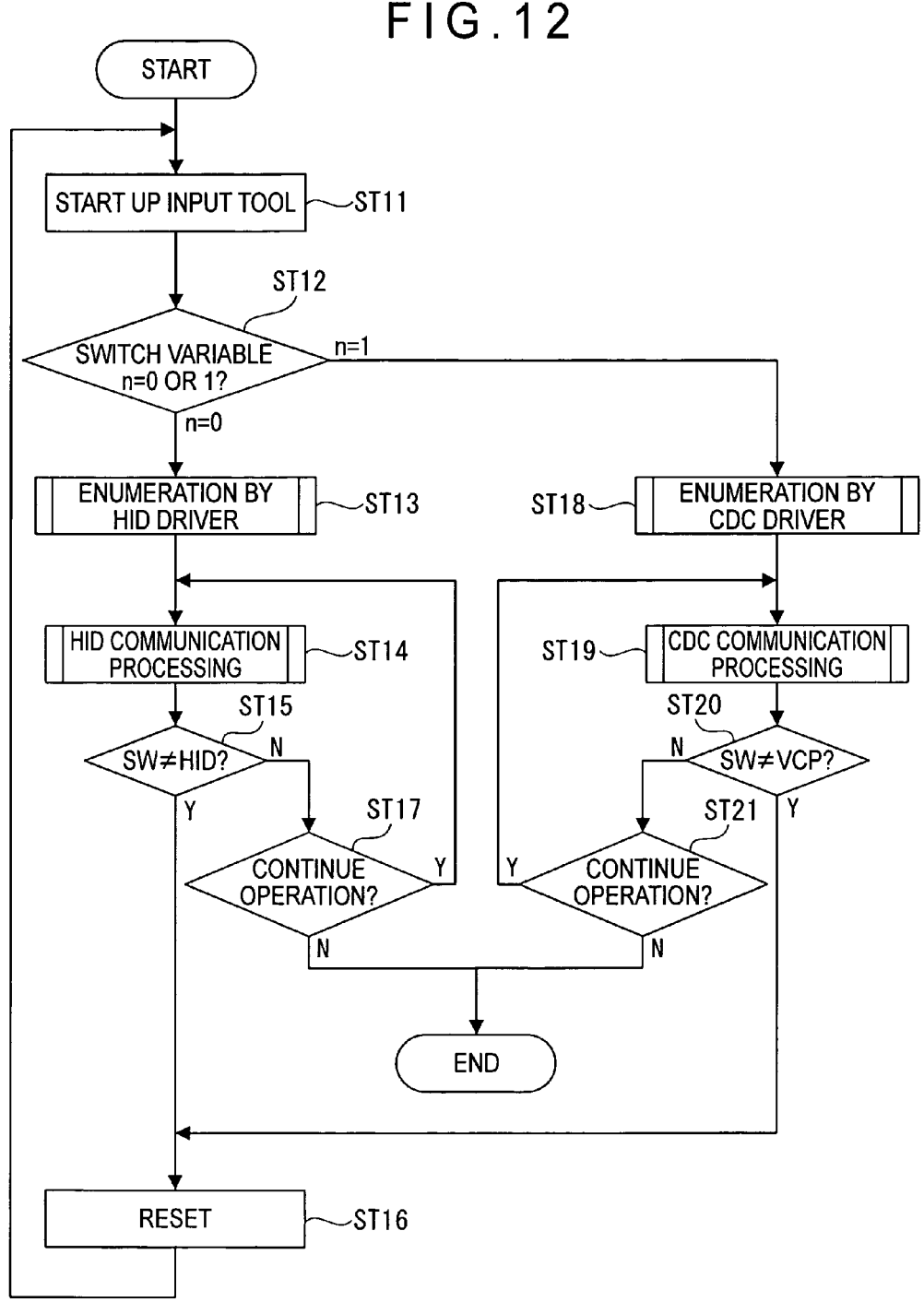
FIG. 12 is a flowchart showing a signal transmission processing in the signal conversion transmission system according to the second exemplary embodiment.

FIG. 12 is a flowchart showing a processing in the signal conversion transmission system according to the second exemplary embodiment.

According to the signal conversion transmission system 1 of the second exemplary embodiment, a user initially switches the switch 36 of the input tool 30A to one of the "HID" and "CDC" positions in accordance with the API of the application software 251.

When the input tool 30A is connected to the PC 20, the start-up process is initiated by the power supplied by the PC 20 (Step ST11).

Then, the conversion controller 353 of the CPU 34 reads the setting of the switch 36 to select the signal format of the measurement signal inputted by the measuring instrument 10.

Specifically, the conversion controller 353 outputs a predetermined monitoring signal to the switch 36. In response, the switch 36 returns a switch variable n=0 when the switch 36 is switched to "HID" and returns the switch variable n=1 when the switch 36 is switched to "CDC." Thus, the conversion controller 353 can easily read the setting of the switch 36.

Subsequently, the conversion controller 353 judges the switch variable n returned by the switch 36 (Step ST12).

At this time, when the conversion controller 353 judges that the switch variable n=0, the input tool 30A serves as an HID keyboard device that performs a signal processing in accordance with the HID keyboard protocol. In other words, the PC 20 recognizes the connected input tool 30A as an HID keyboard device and conducts an enumeration processing by the HID driver 253 (Step ST13).

In this case, the signal conversion transmission system 1 performs the HID communication processing based on the HID keyboard protocol (Step ST14). Specifically, the firmware 35 of the input tool 30A converts the measurement signal inputted via the digimatic interface 11 from the measuring instrument 10 into a signal format based on the HID keyboard protocol by the first signal conversion unit 351. Then, in response to an HID Report inputted by the PC 20, the input tool 30A outputs the measurement signal converted by the second signal conversion unit 352 to the PC 20 as a return HID Report.

The CPU 34 monitors the switch 36 even during communication (Step ST15). When the switch 36 is switched to "CDC", the CPU 34 performs a reset processing (Step ST16). The reset processing terminates the HID communication processing and resets the setting of the input tool to an initial state (in the present instance, to the processing of Step ST11).

On the other hand, when the switch 36 is not switched in Step ST15, the HID communication processing is continued. Subsequently, the input tool 30A judges whether or not the operation should be continued (Step ST17). Specifically, when the disconnection processing with the input tool is conducted by the PC 20, the input tool 30A terminates the series of processing.

On the other hand, when it is judged that the switch variable n=1 in Step S12, the input tool 30A serves as a virtual serial port device that performs a signal processing in accordance with the serial port protocol. In other words, the PC 20 recognizes the connected input tool 30A as a virtual serial port device and conducts an enumeration processing by the CDC driver 254A (Step ST18).

In this case, the signal conversion transmission system 1 performs the CDC bidirectional communication processing based on the CDC protocol (Step ST19). Specifically, the firmware 35 of the input tool 30A converts the measurement signal inputted via the digimatic interface 11 from the measuring instrument 10 into a signal format based on the serial port protocol by the second signal conversion unit 352. Then, in response to a virtual serial port communication request signal inputted by the PC 20, the input tool 30A outputs the measurement signal converted by the second signal conversion unit 352 to the PC 20 as a virtual serial port response processing signal.

The CPU 34 monitors the switch 36 even during CDC communication in the same manner as that in Step ST15 (Step ST20). When the switch 36 is switched to "HID", the CPU 34 performs a reset processing of Step ST16.

On the other hand, when the switch 36 is not switched in Step ST20, the CDC communication processing is continued. Subsequently, the input tool 30A judges whether or not the operation should be continued (Step ST21). Specifically, when the disconnection processing with the input tool 30A is conducted by the PC 20, the input tool 30A terminates the series of processing.

3. Advantages of Signal Conversion Transmission System of Second Exemplary Embodiment According to the signal conversion transmission system 1 of the second exemplary embodiment, the following advantages can be obtained in addition to the advantages of the above-described first exemplary embodiment.

Specifically, the CDC driver 254A installed as a part of standard drivers of the OS is used to perform the CDC bidirectional communication processing between the PC 20 and the input tool 30A in the second exemplary embodiment. With the use of the CDC driver 254A installed as a default in the OS, it is not necessary to additionally install a new device driver to the PC 20 even when the OS is updated, and troublesome work such as a development of new device driver can be eliminated. Further, development cost of such a device driver becomes unnecessary.

The input tool 30A is provided with the switch 36. The conversion controller 353 switches the signal format of the measurement signal in accordance with the setting of the switch 36.

Accordingly, a user not accustomed to the operation of the PC 20 can easily switch the signal format of the measurement signal outputted from the input tool 30A to the PC 20 only by operating the switch 36, so that the operability of the input tool 30A and the signal conversion transmission system 1 can be further improved.

Third Exemplary Embodiment

Next, a signal conversion transmission system according to a third exemplary embodiment of the invention will be described below with reference to the attached drawings.

In the above-described second exemplary embodiment, the signal format of the measurement signal is switched by the switch 36 provided on the input tool 30A. However, the switch sometimes cannot be provided on the input tool on account of, for instance, physical constraints. The signal conversion transmission system of the third exemplary embodiment switches the signal format of the measurement signal in accordance with a request signal outputted by the PC 20. The PC 20 of the first exemplary embodiment exemplarily automatically outputs the request signal when the VCP driver is activated. In contrast, the request signal is outputted in this exemplary embodiment in accordance with the input operation by a user.

Figure 13:
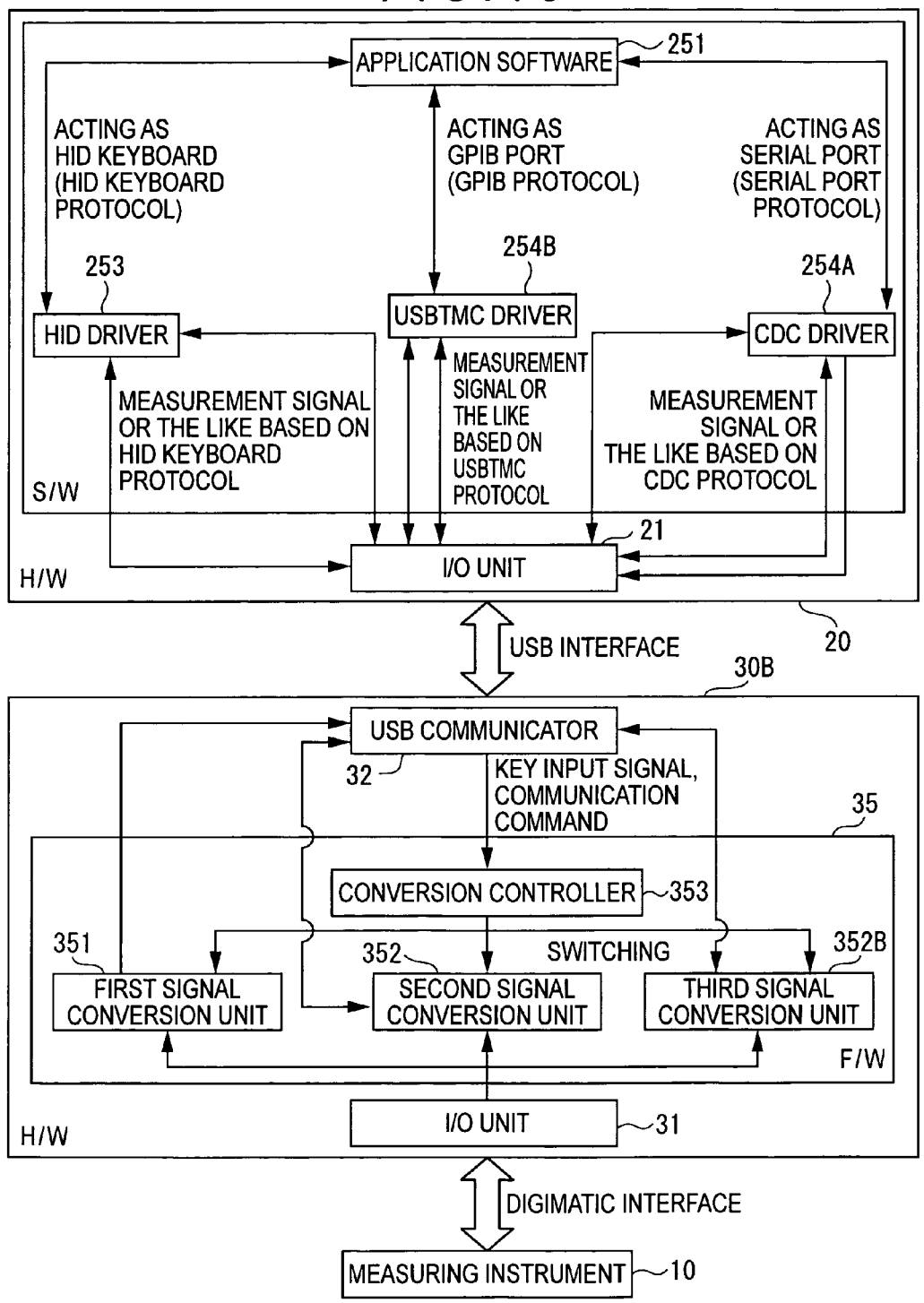
FIG. 13 is a diagram showing an outline of a signal transmission in a signal conversion transmission system according to a third exemplary embodiment of the invention.

FIG. 13 is a diagram showing an outline of a signal transmission in the signal conversion transmission system according to the third exemplary embodiment.

In the signal conversion transmission system 1 according to the third exemplary embodiment, an input tool 30B converts the signal format of the measurement signal into one of three signal formats, i.e. the HID keyboard protocol, serial port protocol and GPIB communication protocol before outputting the measurement signal to the PC 20. Specifically, the firmware 35 of the input tool 30B includes: a first signal conversion unit 351 for converting the signal format of the measurement signal into a signal format according to the HID keyboard protocol; a second signal conversion unit 352 for converting the signal format of the measurement signal into a signal format according to the serial port protocol; a third signal conversion unit 352B for converting the signal format of the measurement signal into a signal format according to the GPIB communication protocol; and a conversion controller 353. Incidentally, the third signal conversion unit 352B is a program that converts the signal format of the measurement signal into a format compatible with the GPIB communication protocol (one of the second communication protocols of the invention) that is processable by the USBTMC driver 254B (one of the second drivers of the invention), which serves as the second signal conversion unit of the invention.

As shown in FIG. 13, the PC 20 has the HID driver 253, the CDC driver 254A and the USBTMC driver 254B as the second driver in accordance with the three signal formats.

In a communication mode in which the measurement signal is outputted from the input tool 30B to the PC 20, the signal conversion transmission system 1 of the third exemplary embodiment switches the communication mode by the USBTMC communication command when the communication mode is switched from the USBTMC communication mode that transmits the measurement signal according to the virtual GPIB communication protocol to another communication mode according to the other protocol. Similarly, when the communication mode is switched from the CDC communication mode that transmits the measurement signal according to the virtual serial port protocol to another communication mode according to the other protocol, the communication mode is switched according to the CDC communication command.

The USBTMC communication command and the CDC communication command are protocol-switching commands (request signal of the invention) provided by the communication application software. The protocol switching command for switching to the HID communication mode defines the first switching request signal of the invention. The protocol switching command for switching to the CDC communication mode or the USBTMC communication mode defines a second switching request signal of the invention.

On the other hand, an application software that issues a dedicated command may be developed for switching the communication mode from the HID communication mode for transmitting the measurement signal according to the HID keyboard protocol to another communication mode according to the other protocol, which, however, accompanies additional development cost for the application software.

Accordingly, in the signal conversion transmission system 1 of the third exemplary embodiment, a key input signal inputted when a predetermined key is pressed on the HID keyboard 40 (input operation device: see FIG. 1) is outputted to the input tool 30B to switch the communication mode.

Specifically, when a plurality of HID devices capable of HID communication according to the HID keyboard protocol are connected to the PC 20, an Output report is usually issued to the all of the HID devices at the same time. For instance, when a plurality of HID keyboards 40 (see FIG. 1) are connected to the PC 20 and a predetermined key (e.g. "NumLock" key) on one of the keyboards is pressed, the key input signal is outputted to all of the HID keyboards 40 to light the "NumLock" LED on all of the HID keyboards.

The signal conversion transmission system 1 of the third exemplary embodiment uses the Output report as the second switching request signal to switch the signal format of the measurement signal of the input tool 30B.

Specifically, one of the less usually frequently used keys among the input keys of the HID keyboard 40 is registered as the predetermined key for protocol switching.

In this exemplary embodiment, when "Scroll Lock" key is once pressed, corresponding Output report is issued also to the input tool 30B. In response, the conversion controller 353 of the input tool 30B converts the measurement signal by the third signal conversion unit 352B. The Output report defines the second switching request command of the invention that switches the communication mode of the measurement signal from the HID communication mode to the USBTMC communication mode in the signal conversion transmission system 1.

When the "Scroll Lock" key is pressed twice in a short time, corresponding Output report is also issued to the input tool 30B. In response, the conversion controller 353 of the input tool 30B converts the measurement signal by the second signal conversion unit 352. The output report defines the second switching request command of the invention that switches the communication mode of the measurement signal from the HID communication mode to the CDC communication mode in the signal conversion transmission system 1.

Incidentally, the communication modes may not be switched to either one of the USBTMC communication mode and the CDC communication mode according to the number of key-press times of a predetermined key (i.e. "Scroll-Lock" key) as in the above example, but may be switched by another arrangement. For instance, when the "Scroll-Lock" key is pressed, the communication mode may be switched to the CDC communication mode, and when the "Caps Lock" key is pressed, the communication mode may be switched to the USBTMC communication mode. Alternatively, the communication mode may be switched in response to a user's action such as long pressing of a predetermined key.

Incidentally, a dedicated communication application software may be employed for switching the communication mode is switched from the HID communication mode that transmits the measurement signal according to the HID keyboard protocol to another communication mode according to the other protocol in the above third exemplary embodiment. In this arrangement, an application software for transmitting a Feature report of the HID keyboard protocol to the input tool 30B operated according to the HID keyboard protocol is prepared. This is because, when an Output report is issued from the application software, the Output report is blocked by the OS and thus is unable to be used for communication purpose. By generating a Feature report as in the above, the Feature report can be transmitted to the input tool 30B. The conversion controller 353 of the input tool 30B switches the communication protocol in accordance with the content of the Feature report. The application that switches the communication protocol according to the issuance and transmission of the Feature report does not accompany significant increase in the development cost and can be easily developed.

Next, the operation of the signal conversion transmission system according to the third exemplary embodiment will be described below with reference to the attached drawings.

Figure 14:
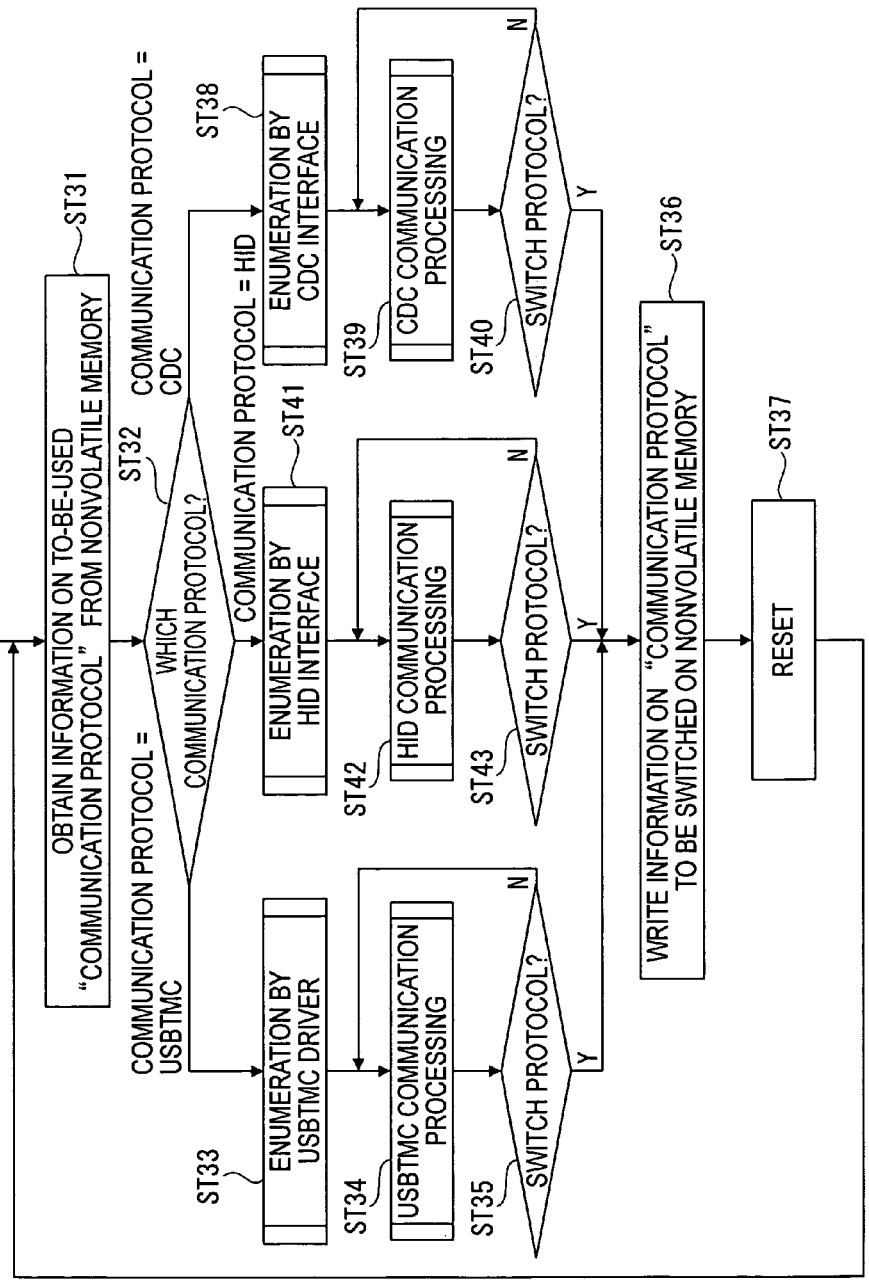
FIG. 14 is a flowchart showing a signal transmission processing in the signal conversion transmission system according to the third exemplary embodiment.

FIG. 14 is a flowchart showing a processing in the signal conversion transmission system according to the third exemplary embodiment.

When the input tool 30B is connected to the PC 20, the start-up process is initiated by the power supplied by the PC 20.

Subsequently, the input tool 30B acquires information on the communication protocol that is initially used from, for instance, a nonvolatile memory (Step ST31). Incidentally, the HID communication mode may be set as a default.

Subsequently, the CPU 34 of the input tool 30B judges the type of the communication protocol acquired in Step ST31 (Step ST32).

When the CPU 34 judges that the acquired information on the communication protocol indicates the USBTMC communication mode, the CPU 34 detects the input tool 30B connected to the PC 20 as a USBTMC device for enumeration processing (Step ST33). Thus, the PC 20 detects the input tool 30B as a USBTMC device and activates the USBTMC driver 254B.

In this case, the signal conversion transmission system 1 performs the USBTMC communication processing based on the GPIB communication protocol (Step ST34). Specifically, the firmware 35 of the input tool 30B converts the measurement signal inputted via the digimatic interface 11 from the measuring instrument 10 into a signal format according to the GPIB communication protocol by the third signal conversion unit 352B and outputs the converted signal to the PC 20.

The input tool 30B monitors the USBTMC communication command inputted by the PC 20 even during a communication (Step ST35). When a communication command for switching the protocol is inputted, the input tool 30B writes information on the communication protocol to be switched according to the communication command on the nonvolatile memory (Step ST36).

Subsequently, the input tool 30B performs the resetting. (Step ST37). In the resetting, the firmware of the input tool 30B is reset, where a bus reset is generated in the USB interface. Subsequently, the process returns back to Step ST31.

On the other hand, when no communication command for switching the protocol is received in Step ST35, the USBTMC communication processing is continued. Subsequently, the input tool 30B judges whether or not the operation should be continued. Specifically, when the disconnection processing with the input tool 30B is conducted by the PC 20, the input tool 30B terminates the series of processing.

When the CPU 34 judges that the acquired information on the communication protocol indicates the CDC communication mode, the CPU 34 detects the input tool 30B connected to the PC 20 as a CDC device for enumeration processing (Step ST38). Thus, the PC 20 detects the input tool 30 as a CDC device and activates the CDC driver 254A.

In this case, the signal conversion transmission system 1 performs the CDC communication processing according to the serial port protocol (Step ST39). Specifically, the firmware 35 of the input tool 30B converts the measurement signal inputted via the digimatic interface 11 from the measuring instrument 10 into a signal format according to the serial port protocol by the second signal conversion unit 352 and outputs the converted signal to the PC 20.

The input tool 30B monitors the CDC communication command inputted by the PC 20 even during a communication (Step ST40). When a communication command for switching the protocol is inputted, the input tool 30B performs the processing of Step ST36 to write information on the communication protocol to be switched according to the communication command on the nonvolatile memory.

Subsequently, the input tool 30B performs the resetting of Step ST37 and the process returns back to Step ST31.

On the other hand, when no communication command for switching the protocol is received in Step ST40, the CDC communication processing is continued. Subsequently, the input tool 30B judges whether or not the operation should be continued. Specifically, when the disconnection processing with the input tool 30B is conducted by the PC 20, the input tool 30B terminates the series of processing.

When the CPU 34 judges that the acquired information on the communication protocol indicates the HID communication mode, the CPU 34 detects the input tool 30B connected to the PC 20 as an HID device for enumeration processing (Step ST41). Thus, the PC 20 detects the input tool 30B as an HID device and activates the HID driver 253.

In this case, the signal conversion transmission system 1 performs the HID communication processing according to the HID keyboard protocol (Step ST42). Specifically, the firmware 35 of the input tool 30B converts the measurement signal inputted via the digimatic interface 11 from the measuring instrument 10 into a signal format according to the HID keyboard protocol by the first signal conversion unit 351 and outputs the converted signal to the PC 20.

The input tool 30B monitors the Output report even during the communication (Step ST43). When a predetermined key is pressed by the HID keyboard 40 connected to the PC 20, an Output report is outputted to the input tool 30B from the HID driver 253. When the input tool 30B receives the predetermined Output report, the input tool 30B performs the processing according to Step ST36 to write the information on the communication protocol corresponding to the pressed key on the nonvolatile memory.

Subsequently, the input tool 30B performs the resetting of Step ST37 and the process returns back to Step ST31.

On the other hand, when the predetermined key of the HID keyboard 40 is not pressed in Step ST43, the HID communication processing is continued. Subsequently, the input tool 30B judges whether or not the operation should be continued. Specifically, when the disconnection processing with the input tool 30B is conducted by the PC 20, the input tool 30B terminates the series of processing.

Advantages of Signal Conversion Transmission System of Third Exemplary Embodiment In the signal conversion transmission system 1 according to the above-described third exemplary embodiment, the PC 20 transmits the Output report to all of the HID devices when the predetermined key of the HID keyboard 40 is pressed in the HID communication mode. Further, the PC 20 outputs the protocol switching command for switching the USBTMC communication mode or the CDC communication mode to the other communication mode to the input tool 30B. When the conversion controller 353 of the input tool 30B receives the predetermined Output report or the protocol switching command, the conversion controller 353 selects the signal format of the measurement signal in accordance with the Output report or the command.

Accordingly, when the input tool 30B is not provided with the switch 36 as in the input tool 30A according to the second exemplary embodiment, the signal format of the measurement signal can be easily switched in accordance with the request signal inputted by the PC 20.

Further, with the use of the Output report issued by pressing the predetermined key of the HID keyboard 40, the HID communication mode is switched to another communication mode.

Accordingly, no dedicated communication application software has to be developed for switching the HID communication mode to a communication mode corresponding to the other protocol. Thus, without investing cost and labor for developing or updating such an application software, the input tool 30B can be controlled with a simple arrangement.

Fourth Exemplary Embodiment

Next, a signal conversion transmission system according to a fourth exemplary embodiment of the invention will be described below with reference to the attached drawings.

Figure 15:
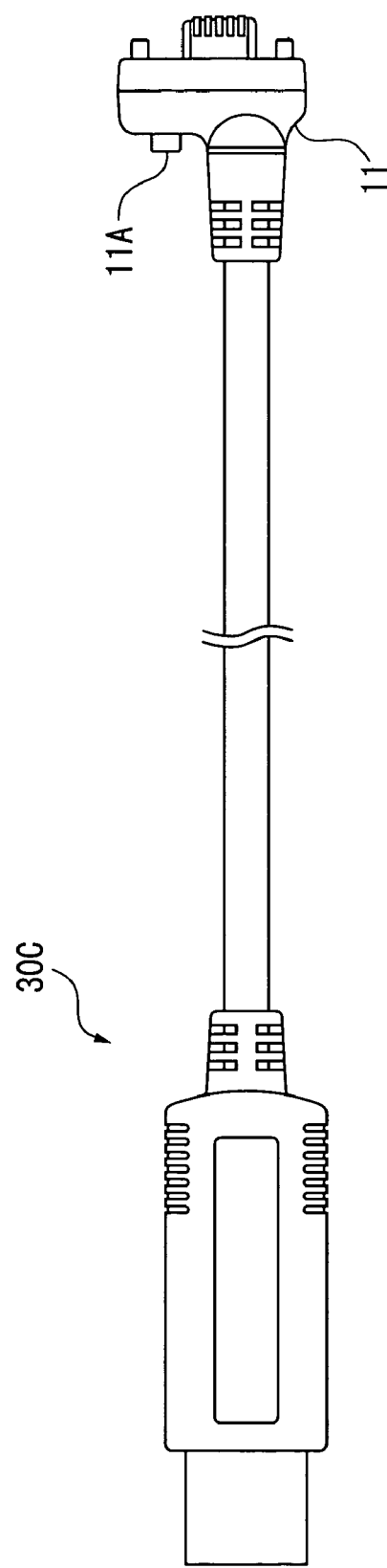
FIG. 15 shows an appearance of an input tool according to a fourth exemplary embodiment of the invention.

FIG. 15 shows an appearance of an input tool according to the fourth exemplary embodiment.

In the above-described third exemplary embodiment, a predetermined key of the HID keyboard 40 is pressed to output the Output report or the communication command to the input tool 30B, so that the request signal is outputted from the PC 20 to the input tool 30B to switch the signal format of the measurement signal. In contrast, in the fourth exemplary embodiment, a DATA button provided to the digimatic interface 11 of an input tool 30C is operated to switch the signal format of the measurement signal to a predetermined protocol. In other words, in contrast to the signal conversion transmission system 1 according to the third exemplary embodiment that switches the communication protocol based on the communication between the PC 20 and the input tool 30B, the signal conversion transmission system 1 according to the fourth exemplary embodiment switches the communication protocol based on the communication between the input tool 30C and the digimatic interface 11 of the measuring instrument 10.

Specifically, as shown in FIG. 15, the input tool 30C of the fourth exemplary embodiment has a DATA button 11A on the digimatic interface 11. The DATA button 11A serves as a trigger for importing to the PC 20 the display value of the measuring instrument 10 connected to the input tool 30C. The hold-down of the DATA button 11A is constantly monitored by the CPU 34.

In accordance with an operation on the DATA button 11A, a request signal for switching to a predetermined protocol is inputted to the CPU 34. The DATA button 11A may be operated in any manner. For instance, the DATA button 11A may be held down for a long time, may be clicked once or double-clicked. Further, the DATA button 11A may be arranged so that the protocol of the measurement signal is switched each time the DATA button 11A is operated. Alternatively, each operation on the DATA button 11A may be assigned with different protocols. For instance, the communication mode may be switched to the HID communication mode when the DATA button 11A is held down for a long time, and the communication mode may be switched to the CDC communication mode when the DATA button 11A is double-clicked.

The input tool 30C is adapted to alter the signal format of the measurement signal to a desired protocol in accordance with a process approximately identical with the above-described third exemplary embodiment. Specifically, in the third exemplary embodiment, the communication command or the Output report of the HID keyboard 40 is inputted from the PC 20 as a request signal and the signal format of the measurement signal is switched according to the request signal. In contrast, the input tool 30C of the fourth exemplary embodiment switches the signal format of the measurement signal in accordance with an operation signal inputted by the DATA button 11A instead of the request signal inputted by the PC 20.

Incidentally, the process of the signal conversion transmission system 1 according to the fourth exemplary embodiment differs only in the above point from that of the third exemplary embodiment. Accordingly, the rest of the process of the signal conversion transmission system 1 will not be described herein.

Advantages of Signal Conversion Transmission System of Fourth Exemplary Embodiment As described above, the signal conversion transmission system of the fourth exemplary embodiment has the DATA button 11A on the digimatic interface 11 of the input tool 30C and the DATA button 11A is operated to output an operation signal for converting the signal format of the measurement signal to accord with a desired protocol.

Accordingly, in addition to the same advantages as in the above-described third exemplary embodiment, the signal format of the measurement signal can be easily switched according to the request signal.

Further, since the signal format of the measurement signal can be converted into a desired protocol only by an operation on the DATA button 11A, the process can be easily performed by, for instance, a user unaccustomed to the operation on the PC 20.

Fifth Exemplary Embodiment

Next, a signal conversion transmission system according to a fifth exemplary embodiment of the invention will be described below.

The signal conversion transmission system 1 of the fifth exemplary embodiment is one of practical applications of the signal conversion transmission system 1 according to the fourth exemplary embodiment, where an adapter connected to the digimatic interface 11 is used to switch the signal format of the measurement signal to accord with a desired protocol.

The digimatic interface 11 will be outlined below.

Figures 16A, 16B:
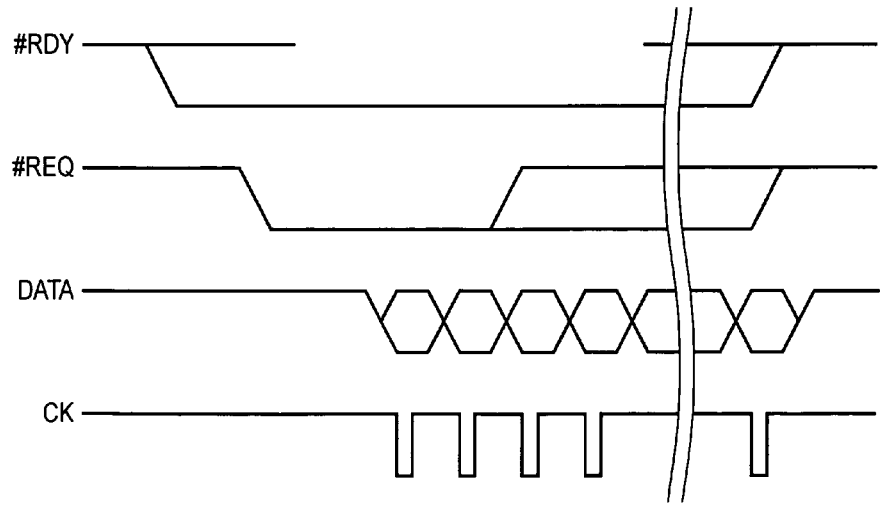
FIG. 16A shows a specification of respective I/O signals of the digimatic interface.
FIG. 16B is a timing chart of respective I/O signals of the digimatic interface.

The digimatic interface 11 of the input tool 30C transmits/receives GND, DATA, CK, RDY and REQ signals shown in FIG. 16A to communicate with the measuring instrument 10.

In the above, GND represents a signal ground; DATA represents a measurement signal inputted by the measuring instrument 10; and CK represents a signal indicating a data-inputting synchronization clock. Further, RDY represents a data transmission signal from the measuring instrument 10 and REQ represents a data request signal outputted from the input tool to the measuring instrument 10.

These signals are transmitted/received between the input tool 30C and the measuring instrument 10 according to a timing chart shown in FIG. 16B.

Specifically, during the communication between the input tool 30C and the measuring instrument 10, the DATA button 11A is held down by a user so that RDY is turned to L (Low level) (timing T1). Incidentally, in an input tool not having the DATA button 11A, RDY is turned to L when the input tool is connected to the measuring instrument 10.

Next, when the input tool 30C detects that RDY is turned to L, the input tool 30C sets REQ at L, which is outputted to the measuring instrument 10 (Timing T2).

Subsequently, when the measuring instrument 10 detects that REQ is turned to L, the measuring instrument 10 sequentially alters DATA and CK to transmit a predetermined bit serial queue to the input tool 30C to output the measurement signal.

In the fifth exemplary embodiment, a loopback connector (not shown) is connected to the digimatic interface 11 of the input tool to switch the signal format of the measurement signal to a desired protocol.

The loopback connector has a circuit that short-circuits RDY and GND and REQ and DATA. Though REQ and DATA are exemplarily short-circuited, REQ and CK may alternatively be short-circuited.

When such a loopback connector is connected to the digimatic interface, since RDY and GND are short-circuited, RDY turns to L. In other words, the status of the signal input/output becomes the same as that at the timing T1 in the communication between the input tool and the measuring instrument 10 via the above-described digimatic interface 11, where the connection of the loopback connector is equivalent to the hold-down of the DATA button 11A.

Accordingly, when the input tool 30C detects that RDY is turned to L, the input tool 30C sets and outputs REQ at L at Timing T2. Further, since REQ and DATA are short-circuited by the loopback connector, DATA turns to L and CK (not short-circuited signal) turns to a pull-up voltage (H: High level).

When the status of DATA and CK does not change within a predetermined period of time, the input tool switches the signal format of the measurement signal in accordance with the signal status as shown in FIG. 17. In other words, the conversion controller 353 of the input tool detects the signal status of DATA and CK as the request signal of the invention.

FIG. 17 shows protocols for switching the measurement signals in response to the signal status of DATA and CK.

Specifically, when both of DATA and CK stay at L for a predetermined time, the conversion controller 353 of the input tool is set so that the measurement signal can be converted into a signal format according to the GPIB communication protocol by the third signal conversion unit 352B. Thus, the input tool and the PC 20 are capable of communication in the USBTMC communication mode.

When DATA stays at L and CK stays at H for a predetermined time, the conversion controller 353 of the input tool is set so that the measurement signal can be converted into a signal format according to the HID keyboard protocol by the first signal conversion unit 351. Thus, the input tool and the PC 20 are capable of communication in the HID communication mode.

When DATA stays at H and CK stays at L for a predetermined time, the conversion controller 353 of the input tool is set so that the measurement signal can be converted into a signal format according to the serial port protocol by the second signal conversion unit 352. Thus, the input tool and the PC 20 are capable of communication in the CDC communication mode.

On the other hand, when both of DATA and CK stay at H for a predetermined time, since the signal status is equivalent to the status in which the digimatic interface 11 is not connected with the measuring instrument 10, the input tool recognizes the status as a connection error and no switching operation of the signal format of the measurement signal is conducted.

Further, when the bit serial queue signal is inputted from the measuring instrument 10 to the input tool as DATA and CK, the input tool conducts a normal data (measurement signal) input operation to acquire the measurement signal.

Incidentally, though the switching of the signal format according to the signal status of the digimatic interface 11 is exemplarily controlled using a loopback connector in the fifth exemplary embodiment, a connector provided with, for instance, an internal signal generator may alternatively be provided for transmitting a special bit serial queue instead of the loopback connector.

Advantages of Signal Conversion Transmission System of Fifth Exemplary Embodiment The same advantages as the above-described fourth exemplary embodiment can be obtained in the signal conversion transmission system of the fifth exemplary embodiment. Further, the signal format of the measurement signal can be easily switched based on the input/output signal transmitted/received via the digimatic interface 11 only by connecting a loopback connector to the digimatic interface 11 of the input tool. Further, even when DATA button 11A as in the fourth exemplary embodiment cannot be structurally provided, the signal format of the measurement signal can be switched by connecting such a loopback connector.

Modifications

Incidentally, it should be understood that the scope of the present invention is not limited to the above-described exemplary embodiment(s) but includes modifications and improvements as long as the modifications and improvements are compatible with an object of the invention.

For instance, though the input tool according to the first to fifth exemplary embodiments exemplarily outputs the measurement signal inputted via the digimatic interface 11 (the first communication interface) after converting into a signal transmission format adapted for the USB interface 211 (the second communication interface), other arrangements are possible.

For instance, the first and the second communication interfaces may alternatively be a PS/2 interface, RS-232C interface or the like. Further alternatively, a wireless interface such as Bluetooth (trademark) may be used.

In the above instances, the same advantages as the above-described exemplary embodiments can be obtained by providing, to the input tool, the first signal conversion unit, the second signal conversion unit and the conversion controller for switching a plurality of signal formats in accordance with the API of the application software 251 run by the signal processor.

Though the input tool 30 for converting the signal format of the measurement signal into one of the HID keyboard protocol that is processable by the HID driver 253 and the VCP protocol processable by the VCP driver 254 is exemplarily used in the first exemplary embodiment, the input tool 30 may be provided with more than two signal converters corresponding to more number of APIs so that the conversion controller selects one of the signal converters to convert the signal format of the measurement signal.

Further, though the HID driver 253 is usually provided as a default on the OS installed on the PC 20 as described above, the VCP driver 254 has to be separately installed. On the other hand, the VCP driver 254 may alternatively be installed in the input tool 30 to be transmitted to the PC 20 to be installed to the storage of the PC 20 when the input tool 30 is initially connected to the PC 20 in the first exemplary embodiment. Further alternatively, the VCP driver 254 may be stored in the other recording medium, from which the VCP driver 254 is installed to the PC 20.

Though the API detector 255 is a program controlled by the application software 251 as shown in FIG. 4 and the device detector 252 switches the driver according to the detection results of the API detector 255 in the first exemplary embodiment, other arrangements are possible. For instance, a user may alternatively set in advance a driver to be activated by setting the device manager and the like of Windows and the enumeration process may be performed by the designated driver. Further alternatively, a user may set in advance the API to be used and the device detector 252 may switch the driver in accordance with the designated API.

Though the signal conversion transmission system 1 in the second exemplary embodiment exemplarily establishes a communication between the input tool 30A and the PC 20 according to one of the HID communication mode and the CDC communication mode, the signal conversion transmission system 1 may alternatively be capable of switching further to the USBTMC communication mode as in the third to fifth exemplary embodiments. Further alternatively, the signal conversion transmission system 1 may be capable of switching to communication mode according to more number of communication protocols.

Specific structures and processes in implementing the invention may alternatively be arranged as long as they are compatible with an object of the invention.

What is claimed is:

1. A signal converter that connects a measuring instrument for conducting a predetermined measurement and outputting a measurement signal obtained by the measurement with a signal processor for processing the measurement signal and transmits to the signal processor a signal outputted by a first communication interface provided on the measuring instrument after converting the signal in a signal transmission format capable of being inputted to a second communication interface provided on the signal processor, the signal converter comprising:
   a first communication unit that has the first communication interface;
   a first signal conversion unit that converts the measurement signal in a signal format according to a first communication protocol that is processable by a first driver installed in the signal processor;
   a second signal conversion unit that converts the measurement signal in a signal format according to a second communication protocol that is processable by a second driver installed in the signal processor;
   a conversion controller that selects one of the first signal conversion unit and the second signal conversion unit, selected one of the first and the second signal conversion units performing the conversion of the measurement signal; and
   a second communication unit that has a second communication interface that is capable of being connected with the signal processor, the second communication unit outputting the measurement signal.

2. The signal converter according to claim 1, wherein
   the second communication interface is a Universal Serial Bus (USB) connection interface,
   the signal processor has a Human Interface Device (HID) driver that is capable of processing a signal according to an HID keyboard protocol inputted through the USB connection interface, and
   the first signal conversion unit converts the measurement signal in a signal format according to the HID keyboard protocol.

3. The signal converter according to claim 2, further comprising:
   a virtual serial port driver that views the USB connection interface as a serial port interface and is capable of processing the signal inputted through the USB interface according to a serial port protocol, wherein
   the second signal conversion unit converts the measurement signal in a signal format according to a virtual serial port protocol that is processable by the virtual serial port driver.

4. The signal converter according to claim 1, wherein
   the second communication unit is adapted to receive a request signal from the signal processor, and
   the conversion controller selects one of the first signal conversion unit and the second signal conversion unit based on the request signal received by the second communication unit, selected one of the first and the second signal conversion units performing the conversion of the measurement signal.

5. The signal converter according to claim 4, wherein
   when the conversion controller recognizes the request signal, the conversion controller converts the measurement signal by the second signal conversion unit and
   when the conversion controller does not recognize the request signal, the conversion controller converts the measurement signal by the first signal conversion unit.

6. The signal converter according to claim 4, wherein
   the request signal includes a first switching request signal that requests the conversion of the measurement signal by the first signal conversion unit and a second switching request signal that requests the conversion of the measurement signal by the second signal conversion unit,
   when the conversion controller recognizes the first switching request signal in the signal processor, the conversion controller converts the measurement signal by the first signal conversion unit, and
   when the conversion controller recognizes the second switching request signal in the signal processor, the conversion controller converts the measurement signal by the second signal conversion unit.

7. The signal converter according to claim 6, wherein
   the second communication interface is a USB connection interface,
   the first signal conversion unit converts the measurement signal into a signal format according to the HID keyboard protocol,
   the signal processor has an HID driver that is capable of processing a signal according to the HID keyboard protocol inputted by the USB connection interface and is connected with an input operation device that is capable of signal processing by the HID driver, and
   the second switching request signal is an Output report issued in response to a specific key input received from the input operation device.

8. The signal converter according to claim 1, further comprising:
   an operation unit that is capable of setting the signal format of the measurement signal, wherein
   the conversion controller makes one of the first converter and the second converter to convert the signal format of the measurement signal in accordance with a setting of the operation unit.

9. A signal processor that is connectable to a signal converter connected with a measuring instrument that outputs a measurement signal obtained by a predetermined measurement via a first communication interface to convert a signal format of the measurement signal into a signal transmission format that is capable of being inputted to a Universal Serial Bus (USB) connection interface, the signal processor processing the measurement signal received from the signal converter, the signal processor comprising:
   a device detector that performs an automatic device detection when the signal processor is connected;

an application software that processes data of the measurement signal;

a signal format recognizer that recognizes the signal format of the measurement signal requested by the application software;

a Human Interface Device (HID) driver that processes a signal according to an HID keyboard protocol inputted through the USB connection interface; and a virtual serial port driver that views the USB connection interface as a serial port interface and is capable of processing the signal inputted through the USB interface according to a serial port protocol, wherein when the signal format recognizer recognizes that the signal format requested by the application software is a signal format corresponding to the serial port protocol, the virtual serial port driver outputs a request signal that requests the measurement signal in the signal format corresponding to the serial port protocol to the signal converter through the USB connection interface after completing the automatic device detection by the device detector.

10. A signal conversion transmission system, comprising:

a measuring instrument that conducts a predetermined measurement to output a measurement signal obtained by the measurement;

a signal converter that connects the measuring instrument and a signal processor that processes the measurement signal, the signal converter converting a signal format of the measurement signal outputted by a first communication interface provided to the measuring instrument into a signal transmission format that is capable of being inputted to a second communication interface provided to the signal processor and transmitting the measurement signal to the signal processor, the signal converter comprising:

a first communication unit provided with the first communication interface;

a first signal conversion unit that converts the signal format of the measurement signal into a signal format according to a first communication protocol capable of being processed by a first driver installed in the signal processor;

a second signal conversion unit that converts the signal format of the measurement signal into a signal format according to a second communication protocol capable of being processed by a second driver installed in the signal processor;

a conversion controller that selects one of the first signal conversion unit and the second signal conversion unit so that the measurement signal is converted by selected one of the first and the second signal conversion units; and a second communication unit that has the second communication interface capable of being connected with the signal processor, the second communication unit outputting the measurement signal; and the signal processor according to claim 9.

* * * * *